US012586910B2

(12) United States Patent
Kim et al.

(10) Patent No.: US 12,586,910 B2
(45) Date of Patent: Mar. 24, 2026

(54) ANTENNA STRUCTURE AND ELECTRONIC DEVICE COMPRISING SAME

(71) Applicant: Samsung Electronics Co., Ltd., Suwon-si (KR)

(72) Inventors: Youngsub Kim, Suwon-si (KR); Sanghoon Park, Suwon-si (KR); Jungho Park, Suwon-si (KR); Kwanghyun Baek, Suwon-si (KR); Youngju Lee, Suwon-si (KR); Jungyub Lee, Suwon-si (KR); Juneseok Lee, Suwon-si (KR); Dohyuk Ha, Suwon-si (KR); Jinsu Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 18/446,906

(22) Filed: Aug. 9, 2023

(65) Prior Publication Data

US 2023/0387598 A1 Nov. 30, 2023

Related U.S. Application Data

(63) Continuation of application No. PCT/KR2022/001926, filed on Feb. 8, 2022.

(30) Foreign Application Priority Data

Feb. 10, 2021 (KR) ........................ 10-2021-0019445

(51) Int. Cl.
*H01Q 9/04* (2006.01)
*H01Q 21/06* (2006.01)

(52) U.S. Cl.
CPC ......... *H01Q 9/0457* (2013.01); *H01Q 9/0414* (2013.01); *H01Q 21/065* (2013.01)

(58) Field of Classification Search
CPC .. H01Q 9/0457; H01Q 9/0414; H01Q 21/065; H01Q 1/38; H01Q 19/005; H01Q 9/0407; H01Q 1/243; H01Q 1/46
See application file for complete search history.

(56) References Cited

U.S. PATENT DOCUMENTS

| | | | |
|---|---|---|---|
| 6,559,797 | B1 | 5/2003 | Chang |
| 10,498,013 | B2 | 12/2019 | Ma et al. |

(Continued)

FOREIGN PATENT DOCUMENTS

| | | |
|---|---|---|
| CN | 102570022 A | 7/2012 |
| CN | 107230840 A | 10/2017 |

(Continued)

OTHER PUBLICATIONS

Translation of CN-110048224-A (Year: 2019).*

(Continued)

*Primary Examiner* — Renan Luque
(74) *Attorney, Agent, or Firm* — Jefferson IP Law, LLP

(57) ABSTRACT

The disclosure relates to a 5th generation (5G) or pre-5G communication system for supporting a data transmission rate higher than that of a 4th generation (4G) communication system such as long term evolution (LTE). An antenna structure of a wireless communication system is provided. The antenna structure includes a first radiator, a first printed circuit board (PCB) in which the first radiator is arranged, a plurality of second radiators, a second PCB in which the plurality of second radiators are arranged, and a frame structure, wherein the frame structure is arranged such that an air layer is formed between the first PCB and the second PCB, and the plurality of second radiators can include a first metal patch arranged in a region corresponding to the first (Continued)

radiator, and a plurality of second metal patches arranged to be separated from the first metal patch so as to be fed by coupling.

18 Claims, 13 Drawing Sheets

(56) References Cited

U.S. PATENT DOCUMENTS

| | | | |
|---|---|---|---|
| 11,276,926 | B2 | 3/2022 | Yun et al. |
| 11,342,660 | B2 | 5/2022 | Jong et al. |
| 2009/0201211 | A1 | 8/2009 | Saily |
| 2010/0090903 | A1 | 4/2010 | Byun et al. |
| 2018/0294567 | A1 | 10/2018 | O'Brien et al. |
| 2020/0303805 | A1 | 9/2020 | Ryoo et al. |

FOREIGN PATENT DOCUMENTS

| | | | | |
|---|---|---|---|---|
| CN | 110048224 | A | * 7/2019 | ............... H01Q 5/28 |
| CN | 110504537 | A | 11/2019 | |
| CN | 109786952 | B | 3/2021 | |
| EP | 3 654 449 | A1 | 5/2020 | |
| EP | 3 756 236 | A1 | 12/2020 | |
| EP | 3813197 | A1 | 4/2021 | |
| JP | 2006-94349 | A | 4/2006 | |
| JP | 4620018 | B2 | 1/2011 | |
| KR | 10-2001-0105522 | A | 11/2001 | |
| KR | 10-0917847 | B1 | 9/2009 | |
| KR | 10-1164619 | B1 | 7/2012 | |
| KR | 10-1679281 | B1 | 11/2016 | |
| KR | 10-2069236 | B1 | 1/2020 | |
| KR | 10-2085791 | B1 | 3/2020 | |
| KR | 10-2020-0097620 | A | 8/2020 | |
| KR | 10-2020-0109900 | A | 9/2020 | |
| KR | 10-2158031 | B1 | 9/2020 | |
| KR | 10-2020-0129884 | A | 11/2020 | |

OTHER PUBLICATIONS

International Search Report dated May 30, 2022, issued in International Patent Application No. PCT/KR2022/001926.

Koreean Office Action dated Feb. 4, 2025, issued in a Korean Patent Application No. 10-2021-0019445.

Extended European Search Report dated Jun. 18, 2024, issued in European Application No. 22752953.4-1201.

Korean Notice of Final Rejection dated Jul. 1, 2025, issued in a Korean Patent Application No. 10-2021-0019445.

Indian Office Action dated Jan. 29, 2026, issued in Indian Patent Application No. 202317055002.

* cited by examiner

750

700

ANTENNA STRUCTURE AND ELECTRONIC DEVICE COMPRISING SAME

CROSS-REFERENCE TO RELATED APPLICATION(S)

This application is a continuation application, claiming priority under § 365(c), of an International application No. PCT/KR2022/001926, filed on Feb. 8, 2022, which is based on and claims the benefit of a Korean patent application number 10-2021-0019445, filed on Feb. 10, 2021, in the Korean Intellectual Property Office, the disclosure of which is incorporated by reference herein in its entirety.

BACKGROUND

1. Field

The disclosure relates to a wireless communication system. More particularly, the disclosure relates to an antenna structure in a wireless communication system and an electronic device including the same.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultrahigh frequency bands so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

An electronic device using a beamforming technology of a wireless communication system includes a plurality of antenna elements. In order to increase the gain of a signal radiated from the electronic device, a sub-array technology may be used.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an antenna structure in which antenna elements are connected by air coupling and an electronic device including the same, in order to minimize loss due to a transmission line in a wireless communication system.

Another aspect of the disclosure is to provide an antenna structure capable of minimizing the arrangement of transmission lines for forming a sub-array to minimize production cost and an electronic device including the same, in a wireless communication system.

Additional aspects will be set forth in part in the description which follows and, in part, will be apparent from the description, or may be learned by practice of the presented embodiments.

In accordance with an aspect of the disclosure, an antenna structure of a wireless communication system is provided. The antenna structure includes a first radiator, a first printed circuit board (PCB) on which the first radiator is disposed, a plurality of second radiators, a second PCB on which the plurality of second radiators are arranged, and a frame structure, wherein the frame structure is disposed to form an air layer between the first PCB and the second PCB, and the plurality of second radiators include a first metal patch disposed in an area corresponding to the first radiator, and a plurality of second metal patches arranged to be separated from the first metal patch so as to be fed by coupling.

In accordance with another aspect of the disclosure, in an electronic device in a wireless communication system, a plurality of sub-arrays and a plurality of radio frequency integrated circuits (RFICs) connected to correspond to the plurality of sub-arrays, respectively, are provided, wherein the plurality of sub-arrays include a plurality of first radiators, a first printed circuit board (PCB) on which the plurality of first radiators are arranged, a plurality of second radiators, a second PCB on which the plurality of second radiators are arranged, and a frame structure, the frame structure is disposed to form an air layer between the first PCB and the second PCB, and the plurality of radiators include a plurality of first metal patches arranged in an area corresponding to the plurality of first radiators, respectively, and a plurality of second metal patches arranged while being spaced apart from the plurality of first metal patched, respectively, to be fed by coupling.

In accordance with another aspect of the disclosure, in an antenna structure of a wireless communication system, a first printed circuit board (PCB) including a feeding line, a first radiator, a plurality of second radiators, a second PCB, and a frame structure are provided, wherein the frame structure is disposed to form an air layer between the first PCB and the second PCB, the first radiator is disposed on a first surface of the second PCB, the plurality of second radiators are arranged on a second surface opposite to the first surface, the first radiator is fed by coupling from the feeding line of the first PCB, and the plurality of second radiators include a first metal patch disposed in an area corresponding the first radiator and a plurality of second metal patches arranged while being spaced apart from the first metal patch to be fed by coupling.

A device according to various embodiments of the disclosure is able to minimize the loss caused by a transmission line, via a structure (hereinafter, an air coupling sub-array structure) in which a plurality of antenna elements in a sub-array are connected by coupling.

A device according to various embodiments of the disclosure is able to minimize manufacturing costs of an antenna structure and an electronic device including the same, by reducing the number of substrates stacked in a printed circuit board (PCB) via an air coupling sub-array structure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
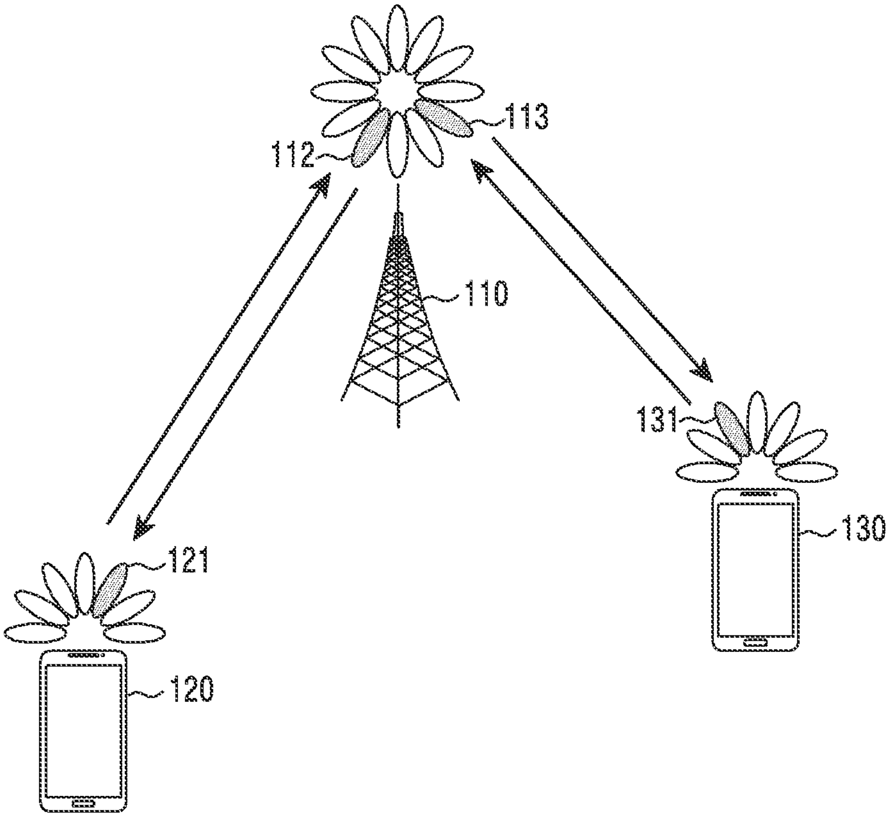
FIG. 1 shows an example of a wireless communication environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

In the description below, terms referring to electronic device components (e.g., board, structure, substrate, printed circuit board (PCB), flexible PCB (FPCB), module, antenna, radiator, antenna element, circuit, processor, chip, element, and device), terms referring to component shapes (e.g., structural body, structure, support, contact, protrusion, and opening), terms referring to connections between structures (e.g., connection lien, feeding line, connection, contact, feeding point, feeding unit, support, contact structure, conductive member, and assembly), terms referring to circuits (e.g., PCB, FPCB, signal line, feeding line, data line, radio frequency (RF) signal line, antenna cable, RF path, RF module, and RF circuit), and the like are illustratively used for the sake of descriptive convenience. Therefore, the disclosure is not limited by the terms as used below, and other terms referring to subjects having equivalent technical meanings may be used. Furthermore, as used below, the terms “unit”, “device”, “member”, “body”, and the like may indicate at least one shape structure or may indicate a unit for processing a function.

An antenna apparatus using a signal of the millimeter-wave (mmWave) band of a wireless communication system may use beamforming and multi-input multi-output technologies to mitigate the path loss of radio waves in the ultra-high frequency band and increase the transmission distance. For such technologies, an electronic device may include a plurality of antenna elements. In addition, in using beamforming technology, an electronic device may use sub-array technology. The sub-array technology refers to a technology for increasing the gain of a corresponding signal by dividing and feeding a fed signal to multiple antenna elements. The sub-array technology may be equally applied to receiving a signal. Antenna elements configured as sub-arrays may radiate signals transmitted (or fed) from a radio frequency integrated circuit (RFIC) or transmit signals received from other devices to the RFIC. According to an embodiment, an electronic device may include a plurality of sub-arrays.

In order to increase communication gain, as the number of antenna elements increases, more RFICs are required. However, the increasing number of RFICs may cause the increase of manufacturing costs of an electronic device. In addition, via the sub-array technology, the number of RFICs may be reduced, but there is a problem that transmission lines for transmitting signals from an RFIC to a plurality of antenna elements increase. Additional printed circuit board (PCB) layers for mounting transmission lines thereon may increase, manufacturing costs for stacking PCB layers may increase, and loss caused by the transmission lines may occur.

Hereinafter, in the disclosure, in order to resolve the described problem, in a sub-array structure including a plurality of antenna elements, via a structure (hereinafter, an air coupling sub-array structure) connecting a plurality of antenna elements, not by a transmission line, but by air coupling, technology for reducing gain loss and cost loss caused by a transmission line is proposed. Additionally, an antenna structure including an air coupling sub-array structure according to an embodiment of the disclosure may be effective in terms of space utilization, and thus be able to mount more antenna elements thereon than a conventional antenna structure, thereby increasing antenna gain.

Hereinafter, in the disclosure, a radiator or a metal patch is used as a term for referring to an antenna element, but this is only for convenience of explanation and embodiments of the disclosure are not limited thereto.

FIG. 1 illustrates a wireless communication system according to an embodiment of the disclosure.

Referring to FIG. 1, illustrates a portion of nodes using a wireless channel in a wireless communication system, and a base station 110, a terminal 120, and a terminal 130. FIG. 1 illustrates only one base station, but may further include another base station the same as or similar to the base station 110.

The base station is a network infrastructure which provides a wireless connection to the terminals 120 and 130. The base station 110 has a coverage defined as a predetermined geographical area based on the distance at which signals may be transmitted. The base station 110 may be referred to as an "access point (AP)", an "eNodeB (eNB)", a "5th generation node (5G node", a "wireless point", a "transmission/reception point (TRP)", or other terms having equivalent technical meaning in addition to the base station.

Each of the terminal 120 and the terminal 130 is a device used by a user, and performs communication with the base station 110 via a wireless channel. In some cases, at least one of the terminal 120 and the terminal 130 may be operated without user involvement. That is, at least one of the terminal 120 and the terminal 130 may be a device which performs machine type communication (MTC) and may not be carried by a user. Each of the terminal 120 and the terminal 130 may be referred to as a "user equipment (UE)", a "mobile station", a "subscriber station", a "customer premises equipment (CPE)", a "remote terminal", a "wireless terminal", an "electronic device", a "user device", or other terms having equivalent technical meaning in addition to the terminal.

The base station 110, the terminal 120, and the terminal 130 may transmit and receive wireless signals in a mmWave band (e.g., 28 gigahertz (GHz), 30 GHz, 38 GHz, and 60 GHz). In order to improve channel gain, the base station 110, the terminal 120, and the terminal 130 may perform beamforming. Beamforming may include transmission beamforming and reception beamforming. That is, the base station 110, the terminal 120, and the terminal 130 may assign directivity to a transmission signal or a reception signal. To this end, the base station 110 and the terminals 120 and 130 may select serving beams 112, 113, 121 and 131 via a beam search or beam management procedure. After the serving beams 112, 113, 121, and 131 are selected, communication may be performed via a resource having a quasi-co-located (QCL) relationship with a resource transmitting the serving beams 112, 113, 121, and 131.

The base station 110 or the terminals 120 and 130 may include an antenna array. Each antenna included in the antenna array may be referred to as an array element or an antenna element. Hereinafter, in the disclosure, an antenna array is shown as a two-dimensional planar array, but this is only one embodiment and does not limit other embodiments of the disclosure. An antenna array may be configured in various forms such as a linear array or a multilayer array. An antenna array may be referred to as a massive antenna array. In addition, an antenna array may include multiple sub-arrays including a plurality of antenna elements.

Hereinafter, via FIGS. 2, 3A, and 3B, the structure of a sub-array and an electronic device including the same will be described for explaining an air coupling sub-array structure to be proposed in the disclosure.

Figure 2:
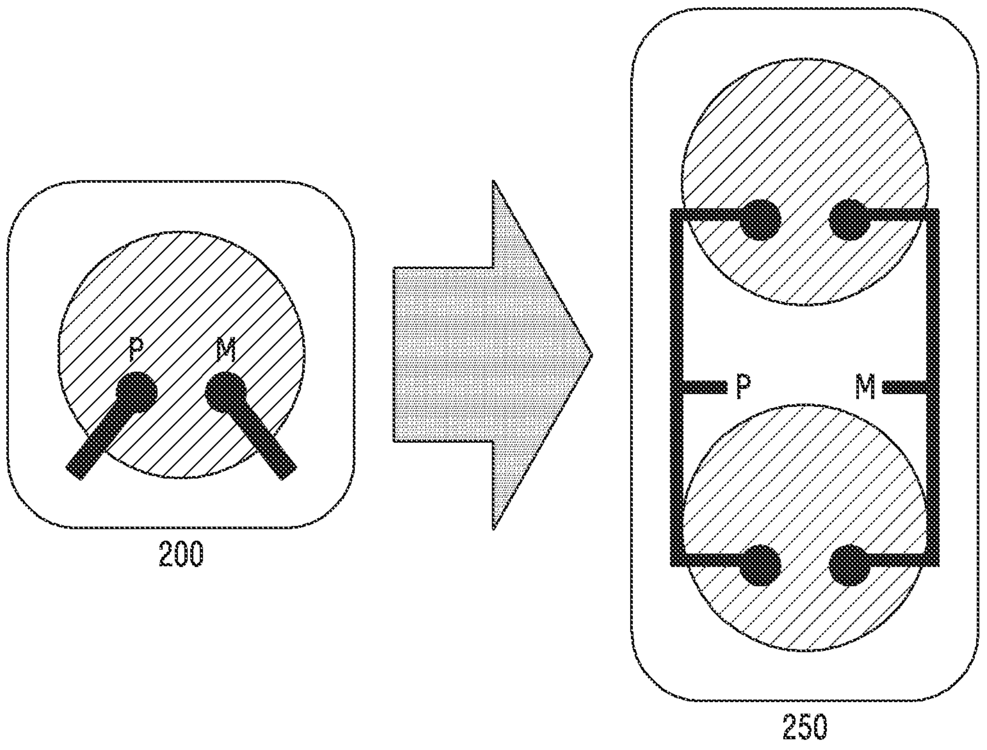
FIG. 2 is a view for explaining a sub-array according to an embodiment of the disclosure.

FIG. 2 is a view for explaining a sub-array according to an embodiment of the disclosure.

Referring to FIG. 2, a structure of an antenna element 200 and a structure of a sub-array 250 are shown. Referring to FIG. 2, the shape of the antenna element is shown in a circular shape, but this is only for convenience of description and is not intended to limit the disclosure. According to an embodiment, a predetermined structure may be used to increase the gain of a co-polarization component due to polarization. For example, as will be described later, the shape of an antenna element is a rectangle (e.g., a square). As another example, the shape of an antenna element is an octagon.

Referring to FIG. 2, the antenna element 200 may include a circular patch or a radiator. In addition, the antenna element 200 may be connected to feeding lines for being fed from a radio frequency integrated circuit (RFIC) (not shown). For example, the antenna element 200 is connected to feeding lines at two points, and the two points may be referred to as a P port (plus port) and an M port (minus port), respectively. The port may be referred to as a feeding point. According to another embodiment, the antenna element 200 may indicate a dual polarization antenna. Polarization refers to an oscillation direction of an electric field when a radio wave is radiated from an antenna. The polarization of the electric field radiated from the antenna is defined as co-polarization, and the polarization of the electric field orthogonal to the co-polarization, which inevitably occurs, is referred to as cross-polarization. That is, the antenna element 200 may be fed for efficient transmission and reception, considering both the co-polarization component and the cross-polarization component. For example, the antenna element 200 receives a signal having a polarization of +45° from the P port, and may receive a signal having a polarization of −45° from the M port. The disclosure is not limited thereto, the positions of the P port and the M port may be switched with each other, and the polarization of the signal fed from the P port and the polarization of the signal fed from the M port may be formed with different values having a difference of 90°. As described above, the antenna element 200 may transmit and receive signals fed from the two ports. In relation to this, in order to increase antenna gain of the antenna element 200, a sub-array 250 structure may be used.

The sub-array 250 may include a plurality of antenna elements. For example, the sub-array 250 includes two antenna elements. In addition, antenna elements fed via the same port pair in the sub-array 250 may transmit and receive the same RF signal, and different antenna elements fed via different port pairs may transmit and receive different RF signals. For example, first antenna elements fed via a first port pair transmits and receives a first RF signal, and second antenna elements fed via a second port pair may transmit and receive a second RF signal. This is because, although digital signals (e.g., data stream, stream, etc.) delivered to on RFIC area the same, signals passing via each RF chain may be processed in different ways from each other by the RF components (e.g., an analog to digital converter (ADC), a phase shifter (PS), a power amplifier (PA), etc.) arranged in a plurality of RF chains arranged in one RFIC. In other words, the sub-array 250 may be fed from an RFIC via the P port and the M port, and each feeding point may be divided into two to be connected to each antenna element. Accordingly, the antenna elements included in the sub-array 250 may transmit and receive the same RF signal transmitted from the RFIC via two ports connected to the sub-array 250. Alternatively, when the sub-array 250 further includes other antenna elements fed via other port pairs, although other antenna elements are fed via the same RFIC, other RF signals may be transmitted and received.

As described above, the total gain may be increased via the sub-array structure. By using a sub-array structure, when compared to an antenna structure which does not use a sub-array structure, the same antenna gain may be formed while reducing the number of RFICs. Hereinafter, FIGS. 3A and 3B compare a case of using a sub-array structure and a case without using a sub-array structure, and explain the sub-array structure.

Figure 3A:
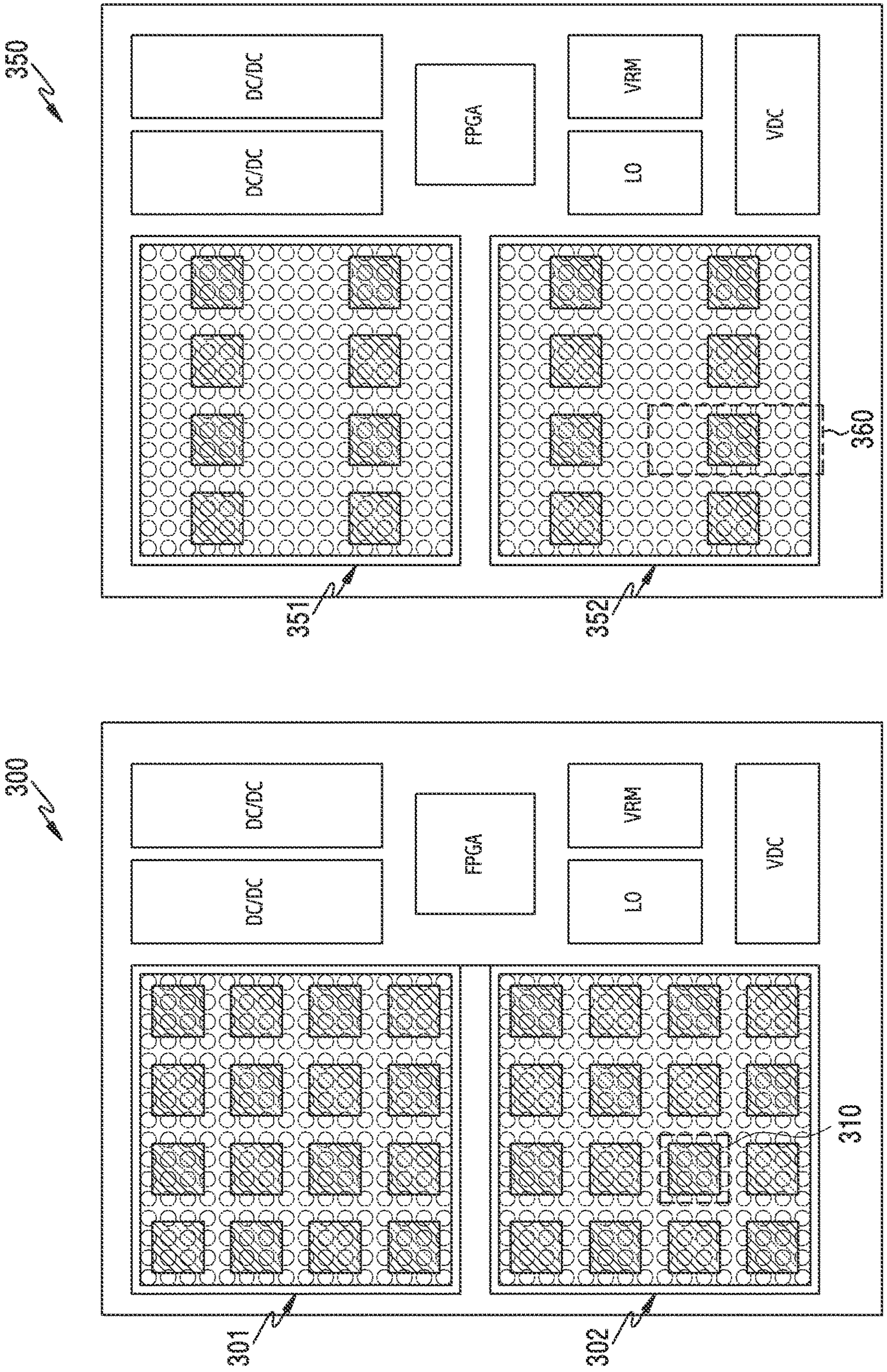
FIG. 3A shows examples of a radio unit (RU) board for explaining a sub-array according to an embodiment of the disclosure.

FIG. 3A shows examples of a radio unit (RU) board for explaining a sub-array according to an embodiment of the disclosure.

Referring to FIG. 3A, an RU board 300 having no sub-array and an RU board 350 including a sub-array is shown. The structure of the RU board 300 or 350 disclosed in FIG. 3A and the number, structure, and shape of elements and components included in the RU board 300 or 350 are merely examples for convenience of explanation, and are not limiting the embodiments of the disclosure. For example, antenna elements included in the RU board 300 or 350 includes a shape such as a circle, a rectangle, or an octagon. As another example, the number of antenna elements or radio frequency integrated circuits (RFICs) included in the RU board 300 or 350 vary.

Referring to FIG. 3A, the RU board 300 or 350 may include antenna PCBs 301 and 302 or 351 and 352 and parts for supplying RF signals to the antenna PCBs 301 and 302 or 351 and 352. In addition, the RU board 300 or 350 may be connected to a plurality of RFICs for processing RF signals. The RU board 300 or 350 may be referred to as a main board, a power board, a mother board, a package board, or a filter board, and the antenna PCBs 301 and 302 or 351 and 352 may be referred to as a first PCB or a second PCB. The first PCB or the second PCB may be referred to as an antenna board, an antenna board, a radiation board, a radiation board, an RF board, or the like.

The RU board 300 or 350 may include components for supplying an RF signal to an antenna. The RU board 300 or 350 may include one or more direct current (DC)/DC converters. The DC/DC converter may be used to convert direct current to direct current. The RU board 300 or 350 may include one or more local oscillators (LOs). The LO may be used to supply a frequency in an RF system. The RU board 300 or 350 may include one or more connectors. The connector may be used to transmit an electrical signal. The RU board 300 or 350 may include one or more dividers. The divider may be used to distribute an input signal and transmit the input signal to multipath. The RU board 300 or 350 may include one or more low-dropout regulators (LDOs). The LDO may be used to suppress external noise and supply power. The RU board 300 or 350 may include one or more voltage regulator modules (VRMs). The VRM may indicate a module to ensure that the proper voltage is maintained. In addition, although not mentioned in FIG. 3A, the RU board 300 or 350 may further include an RF filter for filtering signals. The RU board 300 or 350 may include one or more digital front ends (DFEs). The RU board 300 or 350 may include one or more radio frequency programmable gain amplifiers (rFPGAs). The RU board 300 or 350 may include one or more intermediate frequencies (IFs). In the configuration shown in FIG. 3A, some of the elements shown in FIG. 3A may be omitted or a greater number of elements may be mounted.

Referring to the RU board 300, the antenna PCBs 301 and 302 may include an antenna array, and the antenna array may include a plurality of antenna elements (i.e., radiators). The antenna array may receive RF signals processed by a plurality of RFICs. For example, one antenna array includes 256 antenna elements, and is connected to 16 RFICs. That is, the antenna PCBs 301 and 302 of the RU board 300 may have a structure 310 connected to one RFIC for each of 16 antenna elements.

On the other hand, referring to the RU board 350 including a sub-array structure, antenna PCBs 351 and 352 may include an antenna array, and the antenna array may include a plurality of sub-arrays including some antenna elements (i.e., radiators). The antenna array may receive RF signals processed by a plurality of RFICs. For example, one antenna array includes 256 antenna elements, and may be connected to 8 RFICs. That is, each of the antenna PCBs 351 and 352 of the RU board 350 may have a structure 360 connected to one RFIC for 32 antenna elements. The structure 360 in which one RFIC and 32 antenna elements are connected to each other may be referred to as one sub-array.

Figure 3B:
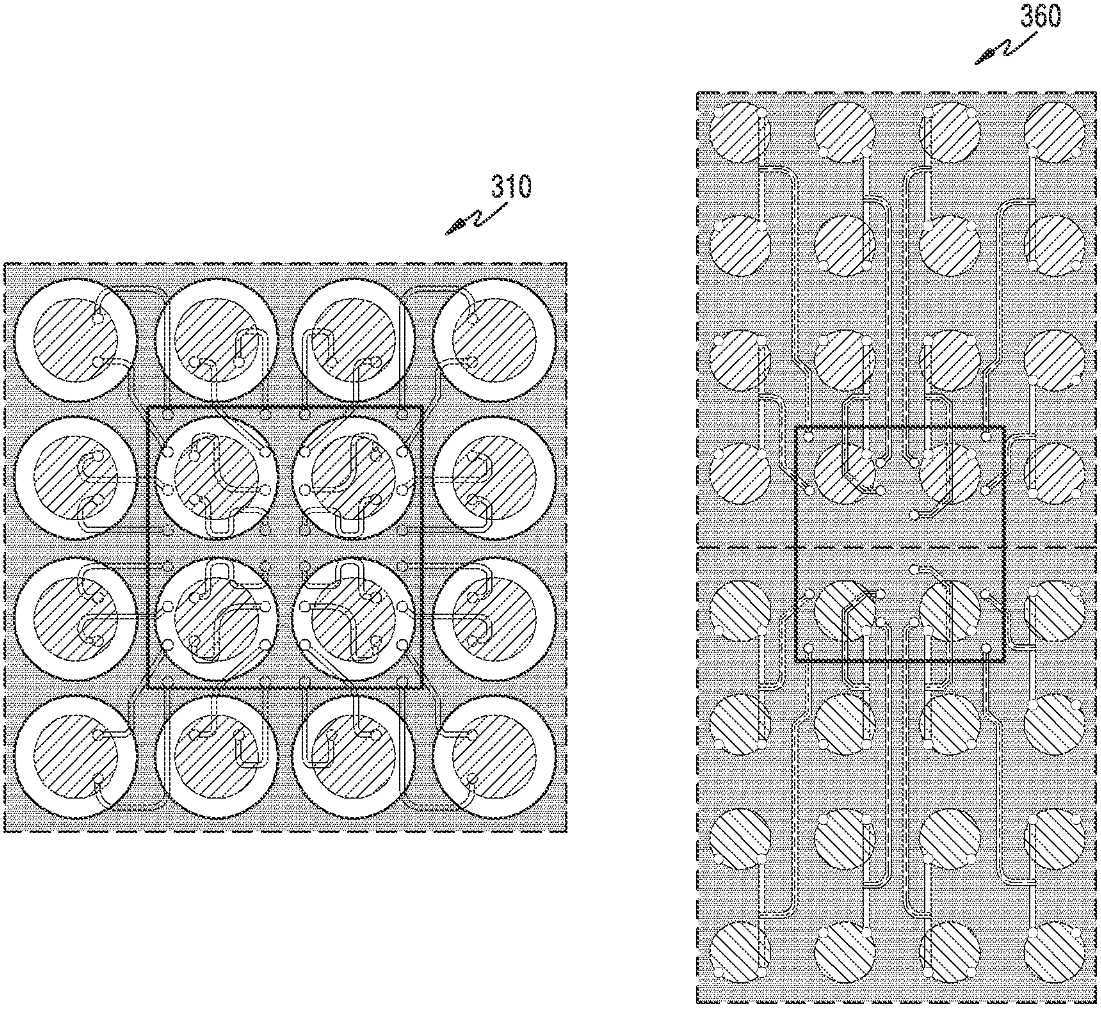
FIG. 3B shows examples for a portion of an antenna printed circuit board (PCB) for explaining a sub-array according to an embodiment of the disclosure.

FIG. 3B shows examples for a portion of an antenna printed circuit board (PCB) for explaining a sub-array according to an embodiment of the disclosure.

Referring to FIG. 3B, the structure 310 of the antenna PCBs 301 and 302 and the structure 360 of the antenna PCBs 351 and 352 are shown. The structures of the antenna PCBs 301 and 302 and the antenna PCB 351 and 352 and the elements disclosed in FIG. 3B and the number, structure, and shape of elements and components included in the antenna PCBs 301 and 302 and the antenna PCBs 351 and 352 are merely examples for convenience of explanation, and are not limiting the embodiments of the disclosure. For example, the antenna elements included in the antenna PCBs 301 and 302 and the antenna PCBs 351 and 352 may have a shape of a circle, a rectangle, an octagon, or the like. As another example, the number of antenna elements or radio frequency integrated circuits (RFICs) included in the antenna PCBs 301 and 302 and the antenna PCB 351 and 352 may vary.

Referring to FIG. 3B, a structure 310 including 16 antenna elements and 1 RFIC and a structure 360 including 32 antenna elements and 1 RFIC are shown. In the structure 310, each antenna element (i.e., radiator) is connected via two ports from one RFIC, and each feed point is directly connected to the RFIC. On the other hand, in the structure 360, each antenna element is connected via two branched ports from one RFIC. That is, as described in FIG. 2, in the structure 360, two antenna elements are paired to be connected to the branched two ports, respectively.

As described above, an electronic device including a sub-array structure may be connected to more antenna elements per RFIC than an electronic device which does not include the sub-array structure. In other words, the antenna structure including a sub-array structure has the advantage of being able to increase the gain of the entire antenna and lower the manufacturing costs. However, compared to a structure which does not include a sub-array structure, in order to transmit signals to more antenna elements, an antenna structure including the sub-array structure requires a transmission line and a new PCB layer for mounting the transmission line to an electronic device including the sub-array structure. Accordingly, the antenna structure including the sub-array structure may increase manufacturing costs due to the mounting of a new PCB layer and loss due to transmission lines, and thus the practical advantage of using the sub-array structure may fade. Hereinafter, in FIGS. 4, 5A, 5B, 6 to 8, 9A, 9B, and 10, in an antenna structure including a sub-array structure, in order to minimize the loss due to a transmission line and the increase in manufacturing costs, a sub-array structure in which antenna elements are connected by air coupling (air coupling sub-array structure) will be described.

Figure 4:
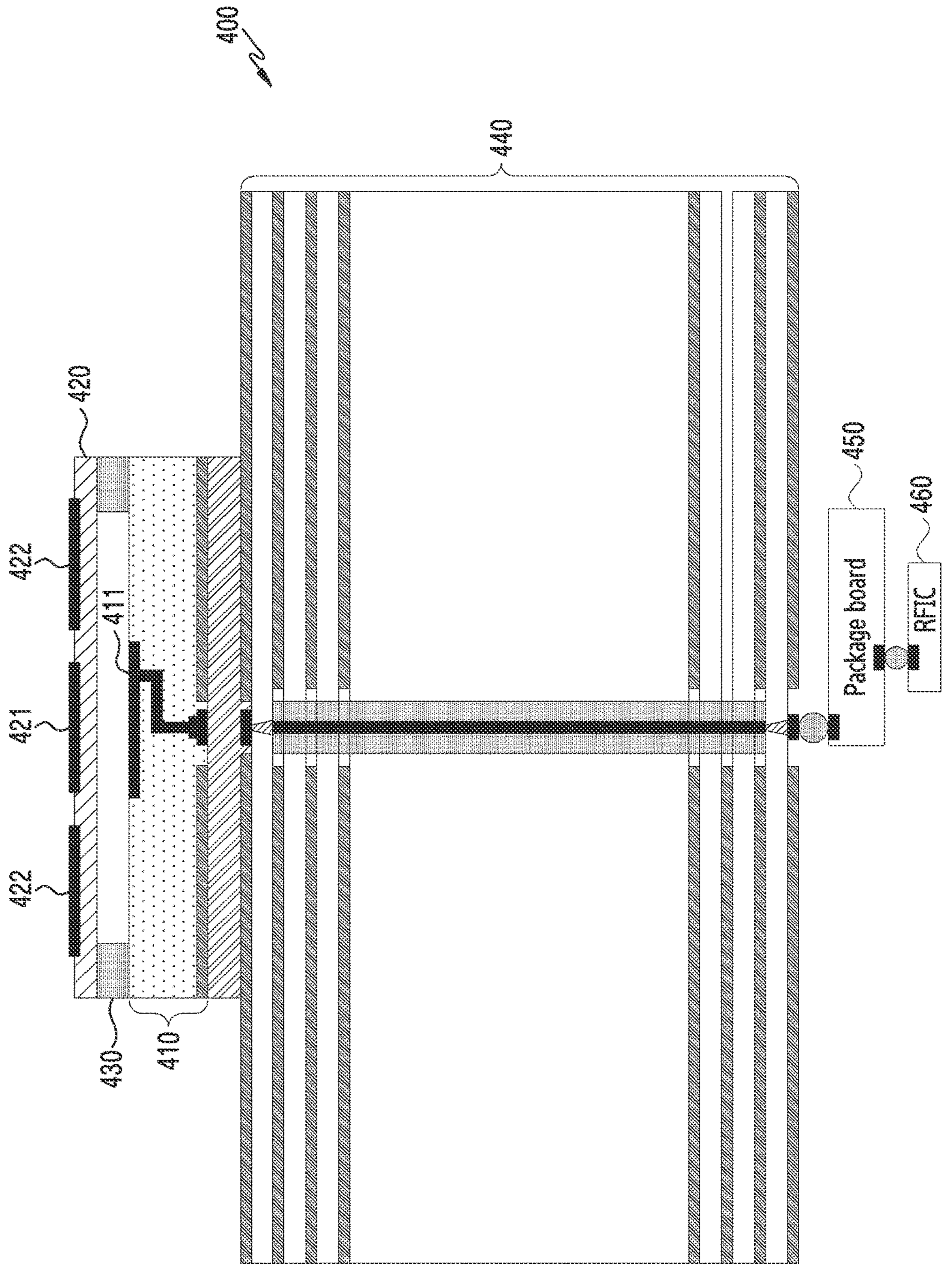
FIG. 4 shows an example of an electronic device including an antenna structure according to an embodiment of the disclosure.

FIG. 4 shows an example of an electronic device including an antenna structure according to an embodiment of the disclosure.

Referring to FIG. 4, a radio unit (RU) board 440 of FIG. 4 may be configured in a structure similar to the RU board of FIG. 3A. In other words, the RU board 440 of FIG. 4 may include elements and components included in the RU board of FIG. 3A, may not include a part thereof, or may further include other elements. In FIG. 4, an electronic device 400 including one first radiator 411 and three second radiators 421 and 422 is shown, but the disclosure is not limited thereto.

Referring to FIG. 4, the electronic device 400 may include a first printed circuit board (PCB) 410, a second PCB 420, a frame structure 430, an RU board 440, a package board 450, and a radio frequency integrated circuit (RFIC) 460. The first PCB 410 and the second PCB 420 may indicate the antenna PCBs of FIG. 3A, as described above.

According to an embodiment, the first PCB 410 may be disposed between the RU board 440 and the frame structure 430. The first PCB 410 may be disposed between the RU board 440 and the frame structure 430, and may thus receive signals from the RFIC 460 via the RU board 440. The reception of signals may indicate feeding. In addition, the first PCB 410 may include the first radiator 411 and a feeding line. The feeding line included in the first PCB 410 may indicate a transmission line for receiving signals from the RU board 440. The first radiator 411 may directly receive signals from the RU board 440 via the feeding line. The disclosure is not limited thereto. As described in FIG. 8 later, the first PCB 410 may not include the first radiator 411, and accordingly, the first radiator 411 may be disposed to be spaced apart from the first PCB 410 to be fed by coupling from the feeding line of the first PCB 410. In addition, the first radiator 411 may indirectly feed a first metal patch 421 of the second PCB 420. The first radiator 411 may be disposed to be spaced apart from the second radiators 421 and 422 by the frame structure 430, and may transmit a signal to the first metal patch 421 disposed to be spaced apart therefrom via the feeding by coupling. In addition, the first radiator 411 may radiate the signal received from the RU board 440 to other electronic devices.

According to another embodiment, the second PCB 420 may be disposed at an upper end portion of the frame structure 430. That is, the second PCB 420 may be disposed to be spaced apart from the first PCB 410 by the frame structure 430. An air layer may be formed between the second PCB 420 and the first PCB 410 by the frame structure 430. The second PCB 420 may include a plurality of second radiators 421 and 422, and the second radiators 421 and 422 may indicate the first metal patch 421 and the plurality of second metal patches 422. The first metal patch 421 may indicate an element configured to be fed from the first radiator 411. Therefore, the first metal patch 421 may be disposed in an area corresponding to the first radiator 411. The corresponding area may be determined according to the relationship between the first metal patch 421 and the first radiator 411. For example, this indicates a state in which the center of the first metal patch 421 and the center of the first radiator 411 coincide. As another example, the corresponding area indicates an area where the area of the first metal patch 421 and the area of the first radiator 411 overlap each other in more than a predetermined range. In other words, the first metal patch 421 may be disposed in an area corresponding to the first radiator 411 in order to efficiently perform feeding by coupling from the first radiator 411. The second metal patches 422 may be spaced a predetermined distance apart from the first metal patch 421 to be disposed in an area adjacent to the first metal patch 421. Accordingly, the second metal patches 422 may be fed by coupling from the first metal patch 422. The predetermined distance may indicate a distance for being efficiently fed by coupling from the first metal patch 421. In addition, the plurality of second radiators 421 and 422 may radiate the fed signal. In other words, the first metal patch 421 may radiate the signal fed from the first radiator 411, and the second metal patches 422 may radiate the signal fed from the first metal patch 421. Via this, the electronic device 400 may transmit and receive a signal more efficiently than before via two stacked radiators (e.g., a first radiator and a second radiator). For example, the electronic device 400 transmits and receive a signal having a broader bandwidth via radiators spaced apart from each other.

According to yet another embodiment, the frame structure 430 may be disposed between the first PCB 410 and the second PCB 420. Due to the frame structure 430 disposed between the first PCB 410 and the second PCB 420, an air layer may be formed therebetween. In addition, the frame structure 430 may be disposed to prevent the radiation of the first radiator 411 and the plurality of second radiators 421 and 422 from being interfered. For example, the frame structure 430 is disposed to prevent the first radiator 411 and the plurality of second radiators 421 and 422 from overlapping each other. In addition, the frame structure 430 may be formed of a conductive member or a non-conductive member. For example the frame structure 430 is formed of metal which is a conductive member. As another example, the frame structure 430 is formed a non-conductive member such as plastic by injection molding.

According to an embodiment, the RU board 440 may be disposed between the first PCB 410 and the package board 450. The RU board 440 may be connected to the first PCB 410 using a coupler or a connector, and may be connected to the package board 450 using a grid array (e.g., a ball grid array (BGA), a land grid array (LGA)). In addition, the RU board 440 may include a plurality of PCB layers, and a transmission line for transmitting the RF signal transmitted from the RFIC 460 via the package board 450 to the first PCB 410. The transmission line may indicate a feeding line.

According to yet another embodiment, the package board 450 may be disposed between the RU board 440 and the RFIC 460. In addition, the package board 450 may be connected to the RU board via a grid array. For example, the grid array is a ball grid array (BGA) or a land grid array (LGA). The package board 450 may be connected to the RFIC 460 by soldering. The package board 450 may transmit the RF signal processed by the RFIC 460 to the RU board.

According to yet another embodiment, the RFIC 460 may include a plurality of RF components for processing RF signals. For example, the RFIC 460 includes a power amplifier, a mixer, an oscillator, a digital to analog converter (DAC), an analog to digital converter (ADC), and the like. According to yet another embodiment, the RFIC 460 may process RF signals in order to transmit or receive a target signal in the electronic device 400, and the RF signal processed by the RFIC 460 may be transmitted or received via the package board 450, the RU board 440, the first PCB 410, the second PCB 420, and the plurality of second radiators 421 and 422.

As described above, in an air coupling sub-array structure according to yet another embodiment of the disclosure, a plurality of radiators (e.g., a first radiator and second radiators) may be connected to one RFIC. The first radiator and the plurality of second radiators may be connected to each other without a transmission line therebetween, and the plurality of radiators may be connected to each other without a transmission line therebetween (i.e., between the first metal patch and the plurality of second metal patches). Accordingly, the first radiator may indirectly feed a signal to the first metal patch among the plurality of second radiators. In addition, the first metal patch may indirectly feed a signal to the plurality of second metal patches spaced a predetermined distance apart from the first metal patch in an area adjacent to the first metal patch. A process of feeding from the first metal patch to the plurality of second metal patches by coupling will be described in detail in FIG. 5A later.

Among the structures shown in FIG. 4, a connection relationship between other components except for coupling feeding between metal patches is shown. That is, of course, a structure different from the structure shown in FIG. 4 (e.g., a connection method between an RU board and a package board, an RFIC connection method, and a vertical plating through hole (PTH) within the RU board) may be used as an embodiment of the disclosure.

Figure 5A:
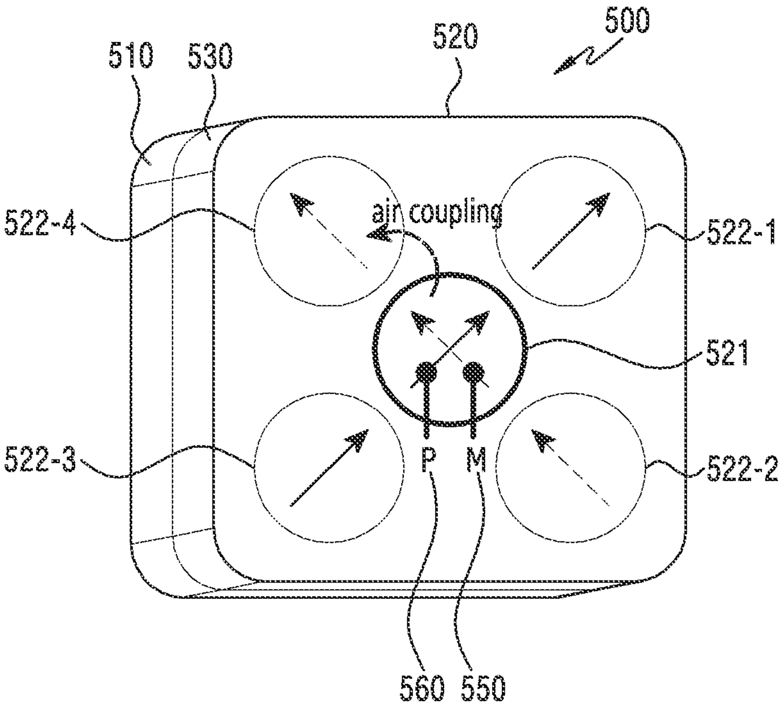
FIG. 5A shows an example of feeding for an antenna structure according to an embodiment of the disclosure.

FIG. 5A shows an example of feeding for an antenna structure according to an embodiment of the disclosure.

Referring to FIG. 5A, an antenna structure 500 of FIG. 5A may indicate a structure including the first PCB 410, the second PCB 420, and the frame structure 430 of FIG. 4. Therefore, in FIG. 5A, the description for a structure which is the same as that in FIG. 4 may be omitted. In addition, in FIGS. 5A and 5B, for convenience of explanation, an antenna structure 500 including one first metal patch 521, four second metal patches 522-1, 522-2, 522-3, and 522-4, and a first radiator (not shown) disposed in an area corresponding to the first metal patch 521 is shown, but this is merely an example for convenience of explanation. As will be described later, the disclosure may indicate a sub-array structure in which the antenna structure 500 is continuously connected.

Referring to FIG. 5A, the antenna structure 500 may include a first PCB 510, a second PCB 520, and a frame structure 530. Although not shown in FIG. 5A, the first PCB 510 may include one first radiator, and the first radiator may be disposed in an area corresponding to the first metal patch 521 of the second PCB 520. In addition, the first PCB 510 and the second PCB 520 may be spaced apart from each other by an air layer formed by the frame structure 530.

According to an embodiment, the second PCB 520 may include a first metal patch 521 and four second metal patches 522-1, 522-2, 522-3, and 522-4. The first metal patch 521 and the four second metal patches 522-1, 522-2, 522-3, and 522-4 may be referred to as second radiators. The second metal patches 522-1, 522-2, 522-3, and 522-4 may be arranged to be spaced a predetermined distance apart from each other around the first metal patch 521. The predetermined distance may indicate a distance for efficient coupling feeding to the second metal patches 522-1, 522-2, 522-3, and 522-4 from the first metal patch 521.

According to another embodiment, the first metal patch 521 may be coupling-fed from a first radiator (not shown). For example, the first metal patch 521 may be fed via two ports (i.e., feeding points), and is referred to as an M port (minus port) 550 and a P port (plus port) 560, respectively. The M port 550 and the P port 560 may be fed in consideration of polarization. For example, for dual polarization, signals having different polarizations fed to the M port 550 and the P port 560. A signal having a polarization of −45° may be fed to the M port 550, and a signal having a polarization of +45° may be fed to the P port 560. However, this only indicates a co-polarization component, and signals actually fed from the M port 550 and the P port 560 may include a cross-polarization component.

In addition, the first metal patch 521 may transmit a signal fed from the first radiator to the four second metal patches 522-1, 522-2, 522-3, and 522-4. For example, the first metal patch 521 feeds a signal fed from the M port 550 to the second metal patches 522-2 and 522-4. As another example, the first metal patch feeds the signal fed from the P port 560 to the second metal patches 522-1 and 522-3. Feeding may indicate indirect feeding (i.e., air coupling) by coupling. However, as described above, this indicates a state in which the co-polarization component is fed. Additionally, the first metal patch 521 may feed the cross-polarization component of the signal fed from the M port 550 to the second metal patches 522-1 and 522-3, and may feed the cross-polarization component of the signal fed from the P port 560 to the second metal patches 522-2 and 522-4.

The antenna structure 500 of FIG. 5A shows only the case of being fed from one first metal patch 521, and the disclosure is not limited thereto. When a plurality of first feeding patches are included on the second PCB 520 of the antenna structure 500 (i.e., when a plurality of first radiators and a plurality of second feeding patches arranged to correspond thereto are further included), a signal including dual polarization may be fed to the second metal patches. This will be described in FIG. 5B later.

Figure 5B:
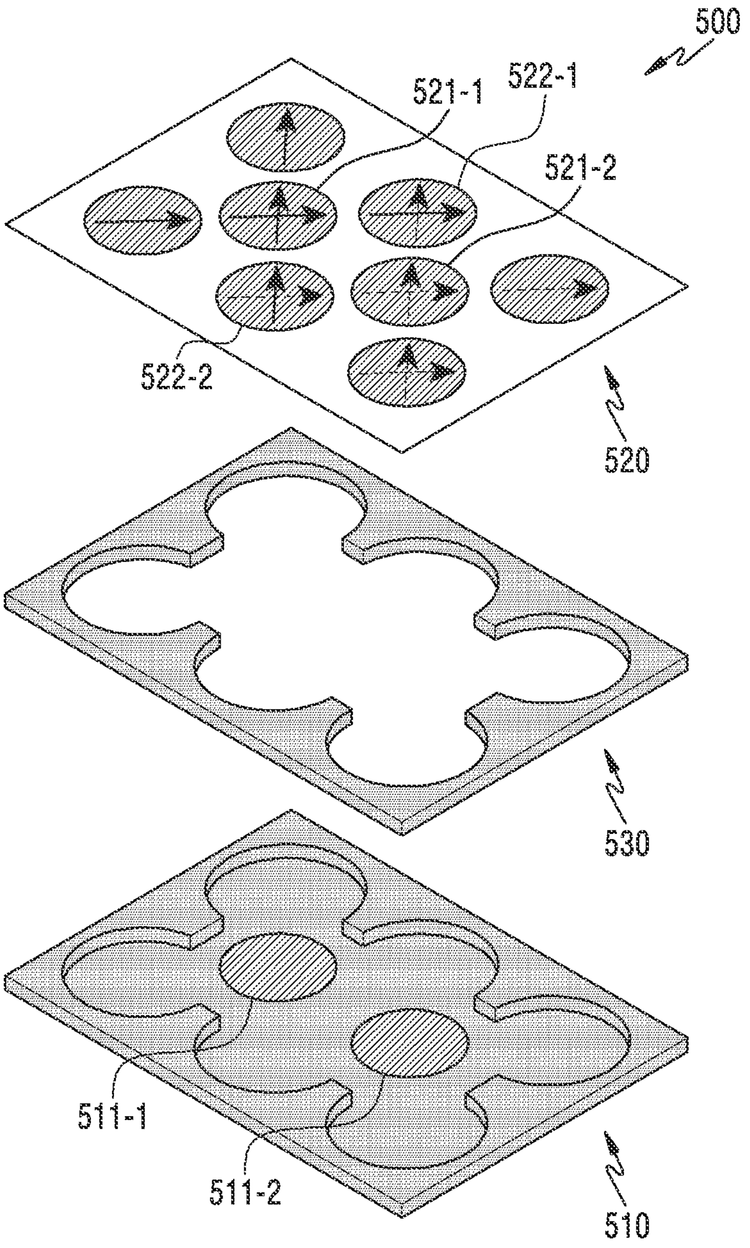
FIG. 5B shows an exploded perspective view for an antenna structure according to an embodiment of the disclosure.

FIG. 5B shows an exploded perspective view for an antenna structure according to an embodiment of the disclosure.

Figure 6:
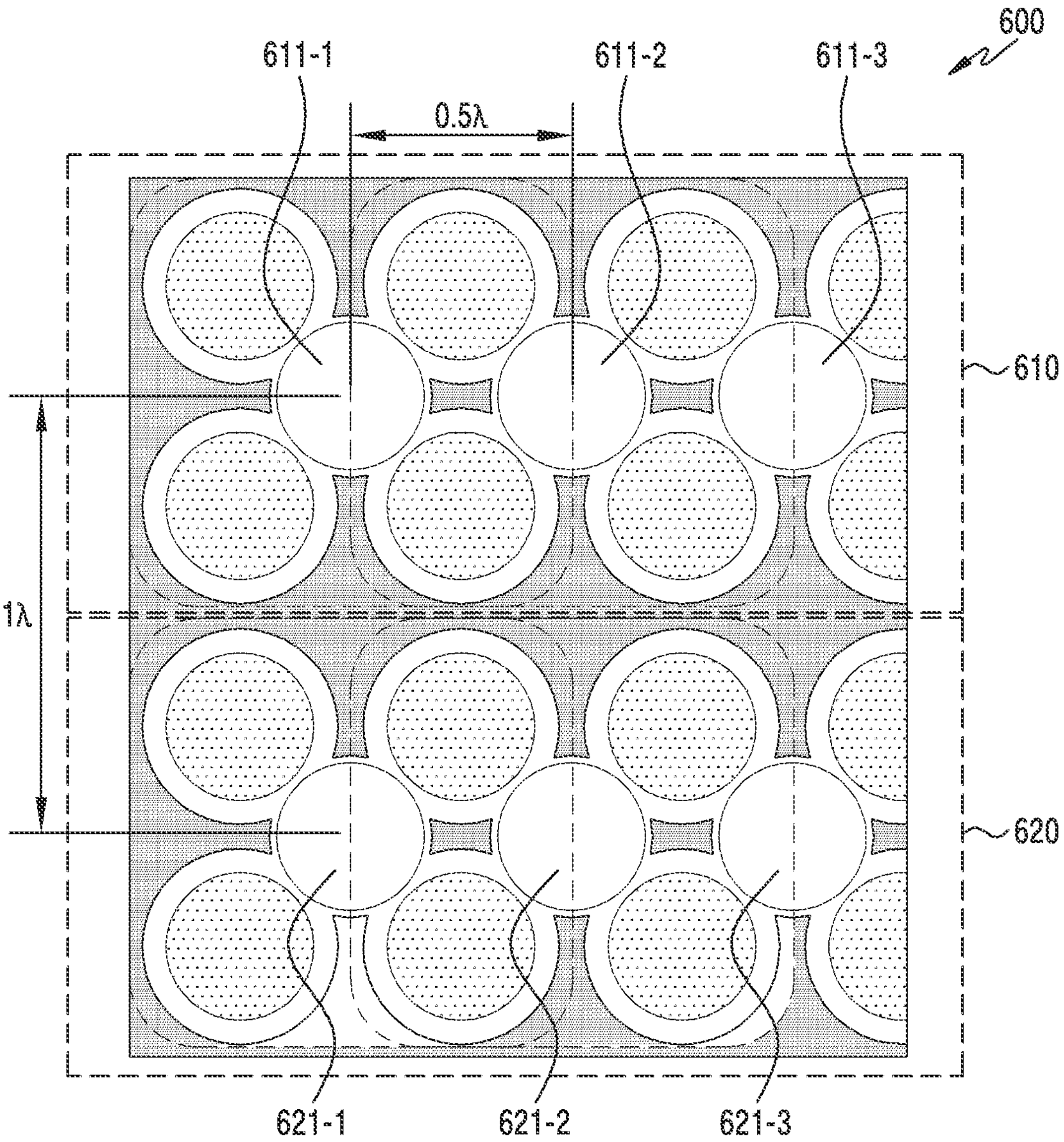
FIG. 6 shows an example of sub-arrays including an antenna structure according to an embodiment of the disclosure.

Referring to FIG. 5B, an antenna structure 500 in which the antenna structure 500 of FIG. 5A has expanded. That is, in the antenna structure 500 of FIG. two first radiators 511-1 and 511-2, two first metal patches 521-1 and 521-2, and six second metal patches are shown. However, this is merely for convenience of explanation, and as shown in FIG. 6 later, the antenna structure may further include radiators and metal patches.

Referring to FIG. 5B, an antenna structure 500 may include a first PCB 510, a second PCB 520, and a frame structure 530. The first PCB 510 may include the two first radiators 511-1 and 511-2. The second PCB 520 may include eight second radiators, and the eight second radiators may be configured by two first metal patches 521-1 and 521-2 and six second metal patches. In addition, the first PCB 510 may be disposed while being spaced apart from the second PCB 520 by the frame structure 530, and an air layer may be formed between the first PCB 510 and the second PCB 520.

According to an embodiment, the first radiators 511-1 and 511-2 may receive (or be fed) an RF signal processed by an RFIC (not shown), and the received RF signal may be fed to the first patches 521-1 and 521-2, respectively. The first radiators 511-1 and 511-2 may receive signals from the RFIC via direct feeding by the feeding line or indirect feeding by the feeding line of the first PCB 510 as will be described later.

According to another embodiment, the first metal patches 521-1 and 521-2 may indirectly feed the second metal patches. For example, a first metal patch 521-1 coupling-feed signals fed via the P port and the M port of the first metal patch 521-1 to four second metal patches arranged adjacent to the first metal patch 521-1, respectively. Particularly, the second metal patch 522-1 may be fed by the P port (e.g., a signal having polarization of +45°) from the first metal patch 521-1, and the second metal patch 522-2 may be fed by the M port (e.g., a signal having polarization of −45°) from the first metal patch 521-1. In addition, for example, the first metal patch 521-2 coupling-feed signals fed via the P port and the M port of the first metal patch 521-2 to four second metal patches adjacent to the first metal patch 521-2, respectively. Particularly, the second metal patch 522-1 may be fed by the M port (e.g., a signal having polarization of −45°) from the first metal patch 521-2, and the second metal patch 522-2 may be fed by the P port (e.g., a signal having polarization of +45°) from the first metal patch 521-2. Therefore, the second metal patch 522-1 may be coupling-fed by the P port from the first metal patch 521-1, and may be coupling-fed by the M port from another first metal patch 521-2. In addition, another second metal patch 522-2 may be coupling-fed by the M port from the first metal patch 521-1, and may be coupling-fed by the P port from another first metal patch 521-2. Accordingly, the second metal patches 522-1 and 522-2 may be fed with signals including dual polarization from the first metal patches 521-1 and 521-2. Hereinafter, in FIG. 6, a sub-array structure in which a plurality of antenna structures 500 of FIG. 5A and a plurality of antenna structures 500 of FIG. 5B are arranged will be described.

FIG. 6 shows an example of sub-arrays including an antenna structure according to an embodiment of the disclosure.

Referring to FIG. 6, an antenna array 600 including a first sub-array 610 and a second sub-array 620 formed by continuously arranging the antenna structures 500 of FIG. 5B. The antenna array 600, the first sub-array 610, and the second sub-array 620 may indicate an antenna PCB connected to the RU board.

Referring to FIG. 6, an antenna array 600 may include a first sub-array 610 and a second sub-array 620, and second metal patches having 2×N arrangement, (N−1) first metal patches, and (N−1) first radiators (not shown) arranged in the areas corresponding to the (N−1) first metal patches, respectively, may be arranged in each of the first sub-array 610 and the second sub-array 620. However, for convenience of explanation, a portion of the structure described above is shown in FIG. 6.

According to an embodiment, the first sub-array 610 may include three first feeding patches 611-1, 611-2, and 611-3, and a plurality of second feeding patches may be arranged in areas spaced a predetermined distance apart around each first feeding patch. For example, four second feeding patches is arranged in an area adjacent to the first feeding patch 611-1, and four second feeding patches may be arranged in an area adjacent to the first feeding patch 611-2. Two second feeding patches arranged in an area between the first feeding patch 611-1 and the first feeding patch 611-2 may be shared by the first feeding patches 611-1 and 611-2. In addition, the two second feeding patches shared by the first feeding patches 611-1 and 611-2 may be fed with signals having polarizations different from each other from the first feeding patch 611-1 and the first feeding patch 611-2, respectively, by air coupling. Such a structure may be equally applied in the second sub-array 620. For example, in the second sub-array 620, four second feeding patches are arranged in an area adjacent to the first feeding patch 621-1, and four second feeding patches may be arranged in an area adjacent to the first feeding patch 621-2. Two second feeding patches arranged in an area between the first feeding patch 621-1 and the first feeding patch 621-2 may be shared by the first feeding patches 621-1 and 621-2. In addition, the two second feeding patches shared by the first feeding patches 621-1 and 621-2 may be fed with signals having polarizations different from each other from the first feeding patch 621-1 and the first feeding patch 621-2, respectively, by air coupling.

According to another embodiment, a first length which is the distance between the first feeding patch 611-1 and the first feeding patch 611-2 and a second length which is the distance between the first feeding patch 611-1 and the first feeding patch 621-1 may be determined according to the wavelength of a signal fed by each first feeding patch. For example, in the first sub-array 610, the first length between the first feeding patch 611-1 and the first feeding patch 611-2 are formed as 0.5λ, when the wavelength of a signal fed by each first feeding patch is A. In addition, for example, between the first sub-array 610 and the second sub-array 620, the second length between the first feeding patch 611-1 and the first feeding patch 621-1 are formed as 1λ. Each of the first length and the second length may indicate a distance between the centers of the first feeding patches. Considering the above description, the length (e.g., when the shape of the patch is a circle, diameter, and when the shape of the patch is a rectangle or octagon, the horizontal or vertical length) of the second feeding patches arranged in an area adjacent to the first feeding patches 611-1, 611-2, 611-3, 621-1, 621-2, and 621-3 may be configured to be smaller than 0.5λ.

Accordingly, an air coupling sub-array structure according to yet another embodiment of the disclosure may have high energy efficiency. For example, assuming that the energy supplied from an RFIC to a first radiator is 1, the energy transferred from the first radiator to a first feeding patch of a second radiator, and from the first feeding patch to second feeding patches are formed with the value of about 0.97. That is, the energy transfer efficiency may be about 97%. In the air coupling sub-array structure according to yet another embodiment of the disclosure, feeding is performed without using a transmission line, and thus loss due to the transmission line does not occur. For example, when fed from the RFIC to each antenna element via two ports, as in the RU board 300 shown in FIG. 3A, an energy transfer efficiency of about 95% may be formed, and a loss of about 3 to 4% may occur due to a loss by a transmission line, thereby forming an energy transfer efficiency of about 91%. Therefore, an air coupling sub-array structure according to an embodiment of the disclosure may have high energy transfer efficiency, compared to conventional structures.

Figure 7:
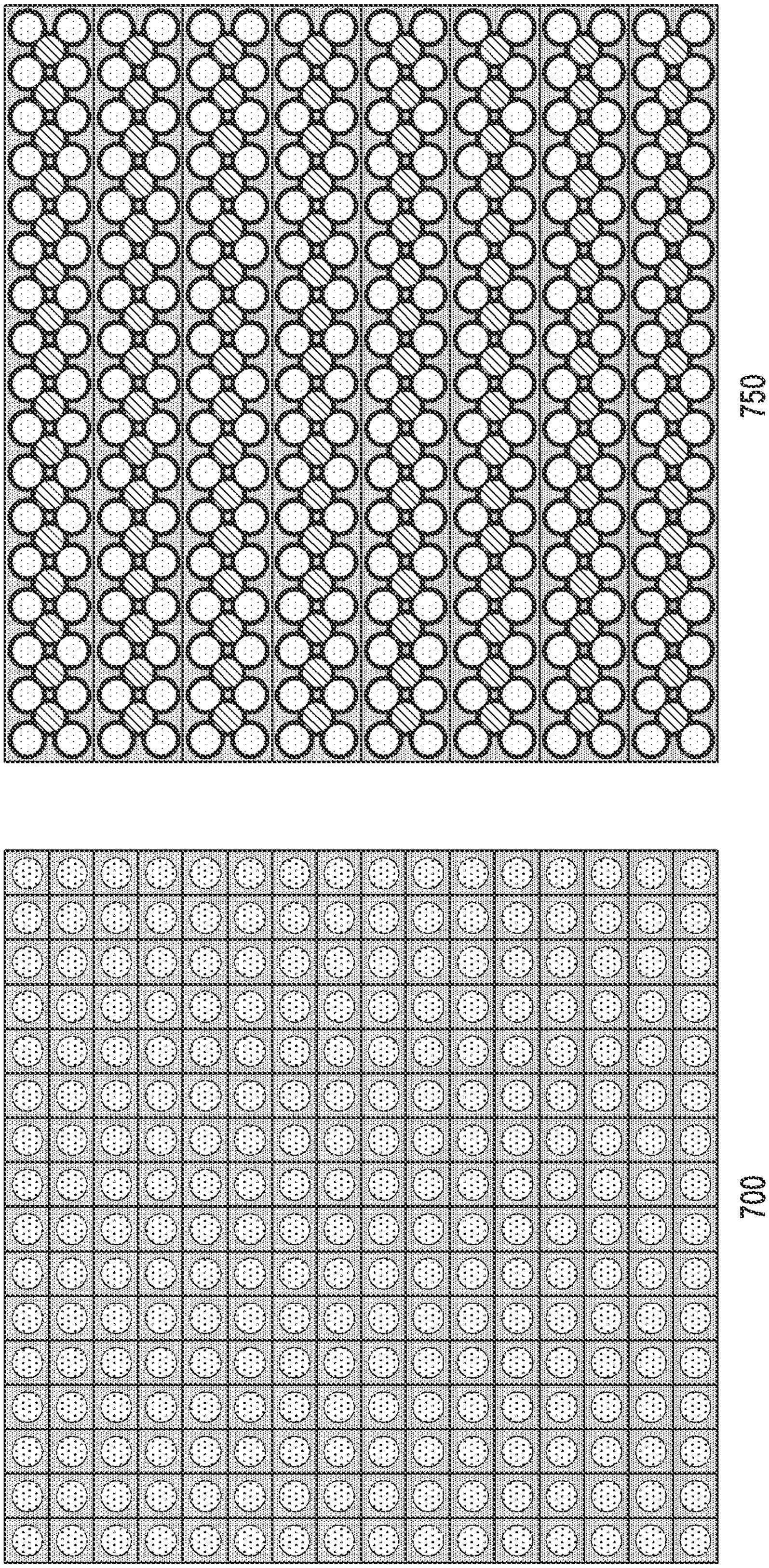
FIG. 7 shows an example of an antenna array including an antenna structure according to an embodiment of the disclosure.

FIG. 7 shows an example of an antenna array including an antenna structure according to an embodiment of the disclosure. An antenna array 700 of FIG. 7 may be understood to be the same as the antenna PCB 301 or 302 of FIG. 3A, and an antenna array 750 may be understood to be the same as the antenna array 600 of FIG. 6. Therefore, the description for the same structure will be omitted.

Referring to FIG. 7, an antenna array 700 may include a plurality of antenna elements. For example, one antenna array 700 includes 256 antenna elements (i.e., radiators). In addition, although not shown in FIG. 7, the antenna array 700 is connected to a plurality of radio frequency integrated circuits (RFICs). For example, the antenna array 700 is connected to 16 RFICs. In other words, in the case of the antenna array 700, 16 antenna elements may be fed from one RFIC. Alternatively, the antenna array 750 may include 8 sub-arrays and 8 RFICs corresponding to each sub-array, and each sub-array may include 16 first feeding patches, 34 second feeding patches, and 16 first radiators (not shown) arranged in an area corresponding to the first feeding patches. In other words, in the case of the antenna array 750, 50 second radiators (i.e., first feeding patches and second feeding patches) may be fed from one RFIC. Therefore, compared to the antenna array 700 which does not include a sub-array structure, the antenna array 750 including an air coupling sub-array structure according to yet another embodiment of the disclosure may mount more radiators (e.g., first radiators and second radiators including first feeding patches and second feeding patches) within the same area. In other words, in the antenna array 750 including an air coupling sub-array structure according to yet another embodiment of the disclosure, the number of radiators corresponding to one RFIC may increase and the number of total RFICs may be minimized. In addition, in an air coupling sub-array structure according to yet another embodiment of the disclosure, via indirect connection by coupling between the first radiators and the first feeding patches and between the first feeding patches and the second feeding patches, a transmission loss may be minimized, and thus a total antenna gain according thereto may be increased. Hereinafter, various embodiments of the above-described air coupling sub-array structure will be described in FIGS. 8, 9A, and 9B.

Figure 8:
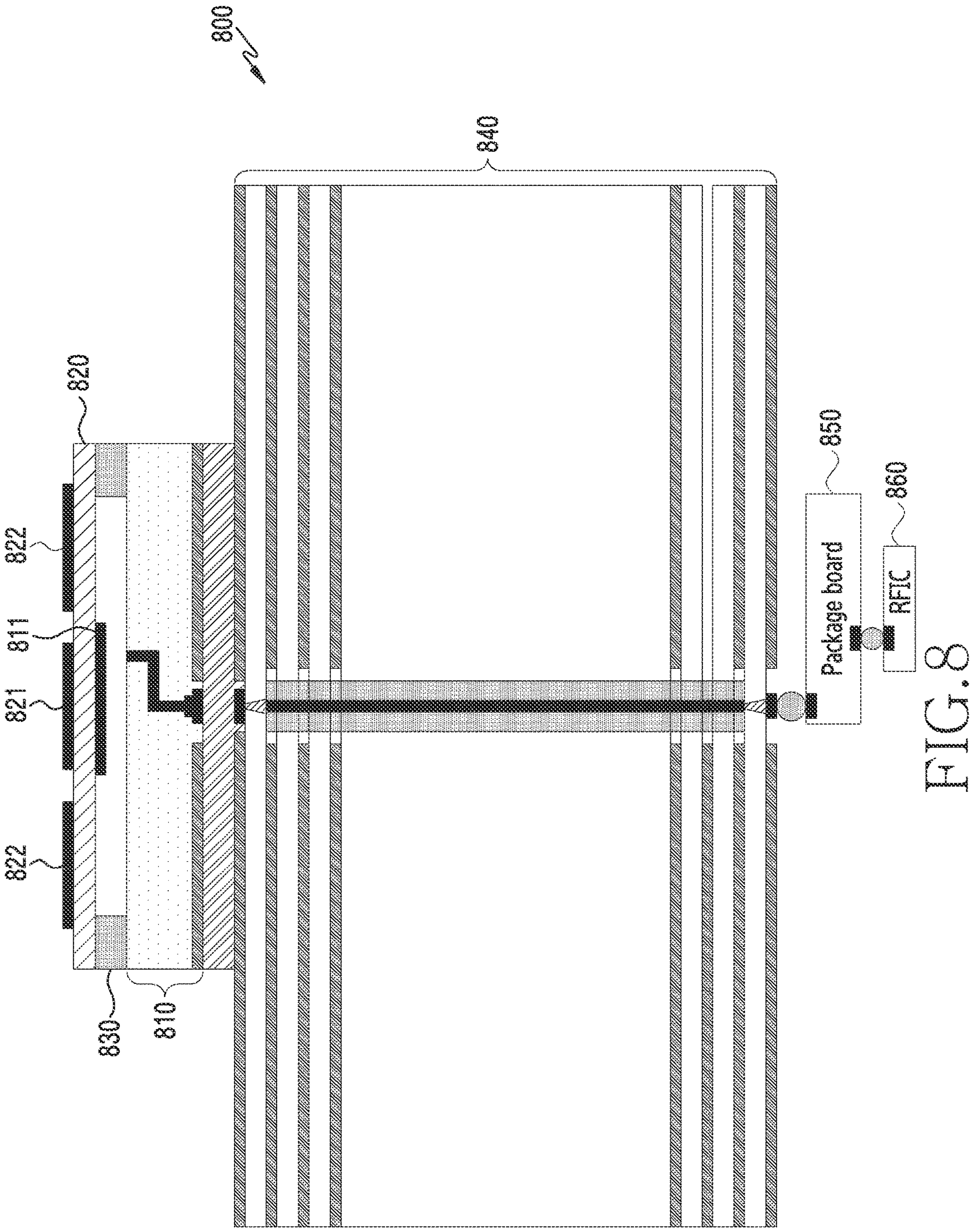
FIG. 8 shows another example of an electronic device including an antenna structure according to an embodiment of the disclosure.

FIG. 8 shows another example of an electronic device including an antenna structure according to an embodiment of the disclosure.

Referring to FIG. 8, an electronic device 800 may include a first printed circuit board (PCB) 810, a second PCB 820, a frame structure 830, a radio unit (RU) board 840, a package board 850, and a radio frequency integrated circuit (RFIC) 860. As described above, the first PCB 810 and the second PCB 820 may indicate the antenna PCB of FIG. 3A.

According to an embodiment, the first PCB 810 may be disposed between the RU board 840 and the frame structure 830. The first PCB 810 may be disposed between the RU board 840 and the frame structure 830, and thus a signal from the RFIC 860 may be transmitted to the first PCB via the RU board 840. The transmission of a signal may indicate feeding. However, unlike the electronic device 400 of FIG. 4, the electronic device 800 may not include a first radiator 811 in the first PCB 810, and may include only a feeding line. Accordingly, the first radiator 811 may be coupling-fed (i.e., indirect feeding) instead of being directly fed by the feeding line connected to the RU board 840 from the RFIC 860. The feeding line included in the first PCB 810 may indicate a transmission line via which a signal may be transmitted from the RU board 840. In addition, the first radiator 811 may indirectly feed the first metal patch 821 of the second PCB 820. The first radiator 811 may be disposed to be spaced apart from second radiators 821 and 822 by the second PCB 820, and may transmit a signal to the first metal patch 821 disposed spaced apart therefrom via feeding by coupling. In addition, the first radiator 811 may radiate the signal transmitted from the RU board 840 to another electronic device.

According to another embodiment, the second PCB 820 may be disposed on an upper end of the frame structure 830. That is, the second PCB 820 may be disposed to be spaced apart from the first PCB 810 by the frame structure 830. An air layer may be formed between the second PCB 820 and the first PCB 810 by the frame structure 830. In addition, the first radiator 811 may be disposed on a first surface of the second PCB 820, and the second radiators 821 and 822 may be arranged on a second surface different from the first surface. The second PCB 820 may include a plurality of second radiators 821 and 822, and the second radiators 821 and 822 may indicate the first metal patch 821 and a plurality of second metal patches 822. The first metal patch 821 may indicate an element which is fed from the first radiator 811. Therefore, the first metal patch 821 may be disposed in an area corresponding to the first radiator 811. The corresponding area may be determined according to the relationship between the first metal patch 821 and the first radiator 811. For example, the corresponding area indicates a state in which the center of the first metal patch 821 and the center of the first radiator coincide. As another example, the corresponding area indicates an area in which the area of the first metal patch 821 and the area of the first radiator 811 overlap each other in more than a predetermined range. In other words, the first metal patch 821 may be disposed in an area corresponding to the first radiator 811 so as to efficiently perform feeding by coupling from the first radiator 811. The second metal patches 822 may be spaced a predetermined distance apart from the first metal patch 821 to be disposed in an area adjacent to the first metal patch 821. Accordingly, the second metal patches 822 may be fed by coupling from the first metal patch 821. The predetermined distance may indicate a distance to be efficiently fed by coupling from the first metal patch 821. In addition, the plurality of second radiators 821 and 822 may radiate the fed signal. In other words, the first metal patch 821 may radiate the signal fed from the first radiator 811, and the second metal patches 822 may radiate the signal fed from the first metal patch 821. Via this, the electronic device 800 may transmit and receive a signal more efficiently than the conventional electronic device via two stacked radiators (e.g., first radiator and second radiator). For example, the electronic device 800 transmits and receives a signal having a broader bandwidth via radiators spaced apart from each other.

According to yet another embodiment, the frame structure 830 may be disposed between the first PCB 810 and the second PCB 820. The frame structure 830 may be disposed between the first PCB 810 and the second PCB 820, and thus an air layer may be formed. In addition, the frame structure 830 may be disposed to prevent the radiation of the first radiator 811 and the plurality of second radiators 821 and 822 from being interfered. For example, the frame structure 830 is disposed to avoid overlapping the first radiator 811 and the plurality of second radiators 821 and 822. In addition, the frame structure 830 may be formed of a conductive member or a non-conductive member. For example, the frame structure 830 is formed of metal which is a conductive member. As another example, the frame structure 830 is formed of a non-conductive member such as plastic by injection molding.

According to yet another embodiment, the RU board 840 may be disposed between the first PCB 810 and the package board 850. The RU board 840 may be connected to the first PCB 810 via a coupler or a connector, and may be connected to the package board 850 via a grid array (e.g., a ball grid array (BGA) and a land grid array (LGA)). In addition, the RU board 840 may include a plurality of PCB layers, and may include a transmission line for transmitting, to the first PCB 810, an RF signal transmitted from the RFIC 860 via the package board 850. The transmission line may indicate a feeding line.

According to yet another embodiment, the package board 850 may be disposed between the RU board 840 and the RFIC 860. In addition, the package board 850 may be connected to the RU board 840 by a grid array. For example, the grid array is a ball grid array (BGA) or a land grid array (LGA). The package board 850 may be connected to the RFIC 860 by soldering. The package board 850 may transmit, to the RU board 840, the RF signal processed by the RFIC 860.

According to yet another embodiment, the RFIC 860 may include a plurality of RF components for processing an RF signal. For example, the RFIC 860 includes a power amplifier, a mixer, an oscillator, a digital to analog converter (DAC), an analog to digital converter (ADC), and the like. According to yet another embodiment, the RFIC 860 may process an RF signal so as to transmit or receive a target signal from the electronic device 800, and the RF signal processed by the RFIC 860 may be transmitted or received via the package board 850, the RU board 840, the first PCB 810, the second PCB 820, the first radiator 811, and the plurality of second radiators 821 and 822.

As described above, in an air coupling sub-array structure according to yet another embodiment of the disclosure, a plurality of radiators (e.g., first radiator and second radiator) may be connected to one RFIC. The first radiator and the plurality of second radiators may be connected to each other without a transmission line therebetween, and the plurality of second radiators (i.e., between the first metal patch and the second metal patches) may be connected to each other without a transmission line therebetween. Accordingly, the first radiator may indirectly feed a signal to the first metal patch among the plurality of second radiators. In addition, the first metal patch may indirectly feed a signal to the plurality of second metal patches spaced a predetermined distance apart therefrom in an area adjacent to the first metal patch.

In the structure shown in FIG. 8, a connection relationship between other components except for coupling feeding between the metal patches is shown. That is, of course, a structure different from the structure shown in FIG. 8 (e.g., a connection method between the RU board and the package board, an RFIC connection method, and a vertical PTH within the RU board) may be used as an embodiment of the disclosure.

Figure 9A:
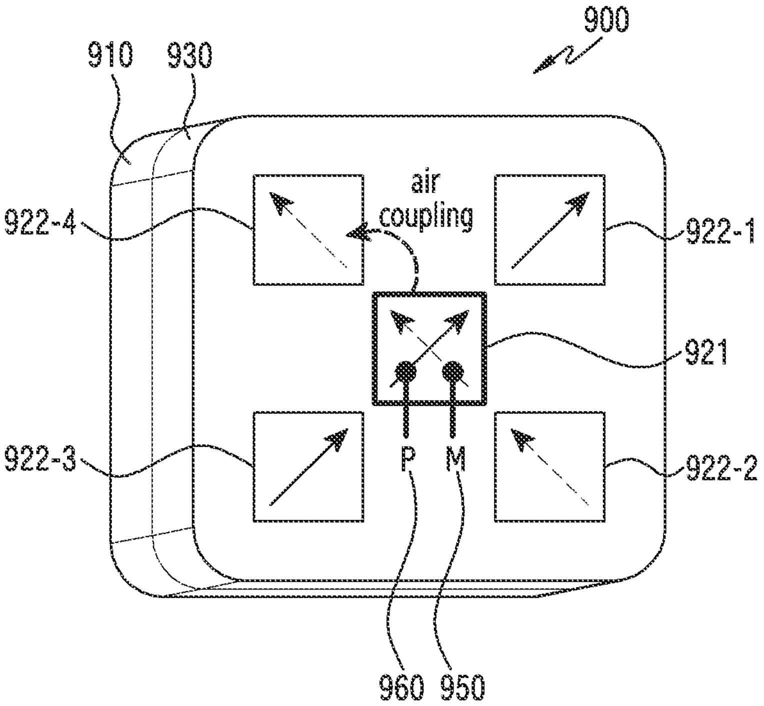
FIG. 9A shows an example of metal patches of an antenna structure according to an embodiment of the disclosure.

FIG. 9A shows an example of metal patches of an antenna structure according to an embodiment of the disclosure.

Figure 9B:
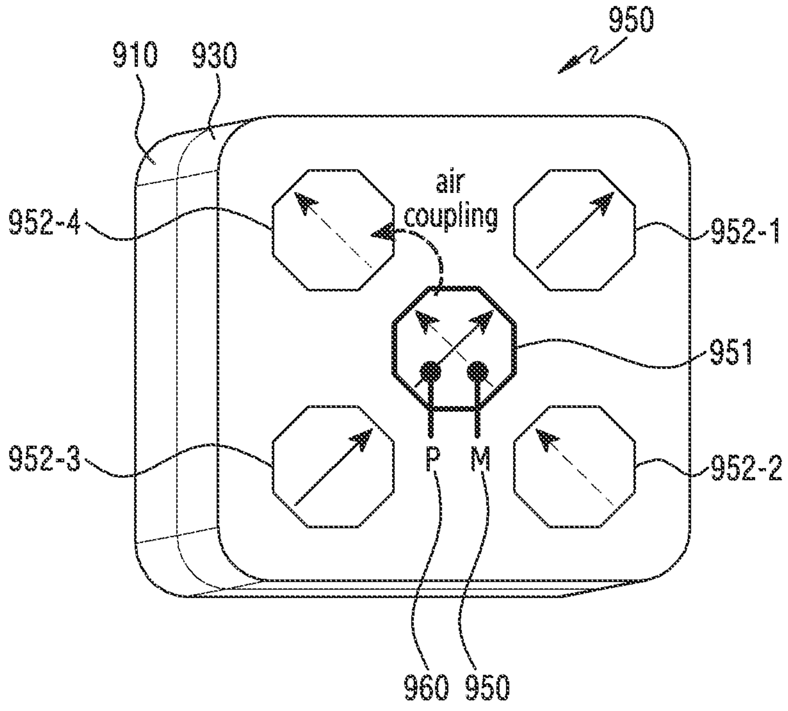
FIG. 9B shows another example of metal patches of an antenna structure according to an embodiment of the disclosure.

FIG. 9B shows another example of metal patches of an antenna structure according to an embodiment of the disclosure. An antenna structure 900 of FIG. 9A and an antenna structure 950 of FIG. 9B may indicate the antenna structure 500 of FIGS. and 5B. For example, a first PCB 910, a frame structure 930 and an P port 960.

Referring to FIG. 9A, unlike the second radiators (i.e., the first metal patch 521 and the second metal patches 522-1, 522-2, 522-3, and 522-4) arranged on the second PCB 520 of the antenna structure 500 of FIGS. 5A and 5B, a first metal patch 921 and second metal patches 922-1, 922-2, 922-3, 922-4 of the antenna structure 900 may be configured in a quadrangular shape. The quadrangle may be interpreted to include all shapes such as a square, a rectangle, and a rhombus. In addition, the first metal patch 921 of the antenna structure 900 may be fed from a first radiator (not shown) at two points, and may feed the fed signal to the second metal patches 922-1, 922-2, 922-3, 922-4. The feeding which the first metal patch 921 receives from the first radiator may indicate a direct feeding or an indirect feeding by coupling, and the feeding which the second metal patches 922-1, 922-2, 922-3, 922-4 receive from the first metal patch 921 may indicate an indirect feeding by coupling. The feeding method described in FIGS. 5A and 5B may be applied to that of the antenna structure in the same manner.

Referring to 9B, unlike the second radiators (i.e., the first metal patch 521 and the second metal patches 522-1, 522-2, 522-3, and 522-4) arranged on the second PCB 520 of the antenna structure 500 of FIG. 5A, a first metal patch 951 and second metal patches 952-1, 952-2, 952-3, 952-4 of the antenna structure 950 may be configured in an octagonal shape. The octagon may be interpreted as a modified structure of the metal patches of FIGS. 9A and 9B in order to increase the radiation efficiency of the metal patches. In addition, the first metal patch 951 of the antenna structure 950 may be fed from a first radiator (not shown) at two points, and may feed the fed signal to the second metal patches 952-1, 952-2, 952-3, 952-4. The feeding which the first metal patch 951 receives from the first radiator may indicate a direct feeding or an indirect feeding by coupling, and the feeding which the second metal patches 952-1, 952-2, 952-3, 952-4 receive from the first metal patch 951 may indicate an indirect feeding by coupling. The feeding method described in FIGS. 5A and 5B may be applied to that of the antenna structure 950 in the same manner.

Referring to FIGS. 4, 5A, 5B, 6 to 8, 9A, 9B, and 10, an air coupling sub-array structure according to various embodiments of the disclosure may be different from conventional technologies. For example, unlike the structure which does not include a sub-array structure, such as the structure of the RU board 300 of FIG. 3A, more radiators (e.g., antenna elements) are mounted with respect to one radio frequency integrated circuit (RFIC), by using a sub-array structure. Accordingly, the total antenna gain of an electronic device including an air coupling sub-array structure according to yet another embodiment of the disclosure may increase, and accordingly, the number of RFICs mounted in the electronic device, thereby reducing manufacturing costs.

As another example, unlike the structure of the RU board 350 of FIG. 3A, which includes a sub-array and connects the RFIC and the radiators by a transmission line, an air coupling sub-array structure according to yet another embodiment of the disclosure indirectly feeds by coupling, not by a transmission line, and thus loss due to a transmission line may not occur and an additional PCB layer for placing a transmission line may not be required, thereby reducing manufacturing costs. In addition, in the air coupling sub-array structure according to yet another embodiment of the disclosure, more radiators may be mounted by maximizing space utilization such as additionally disposing a radiator (e.g., a first feeding patch) for feeding and radiating between the radiators, compared to the conventional sub-array structure, thereby increasing the total antenna gain, too.

Figure 10:
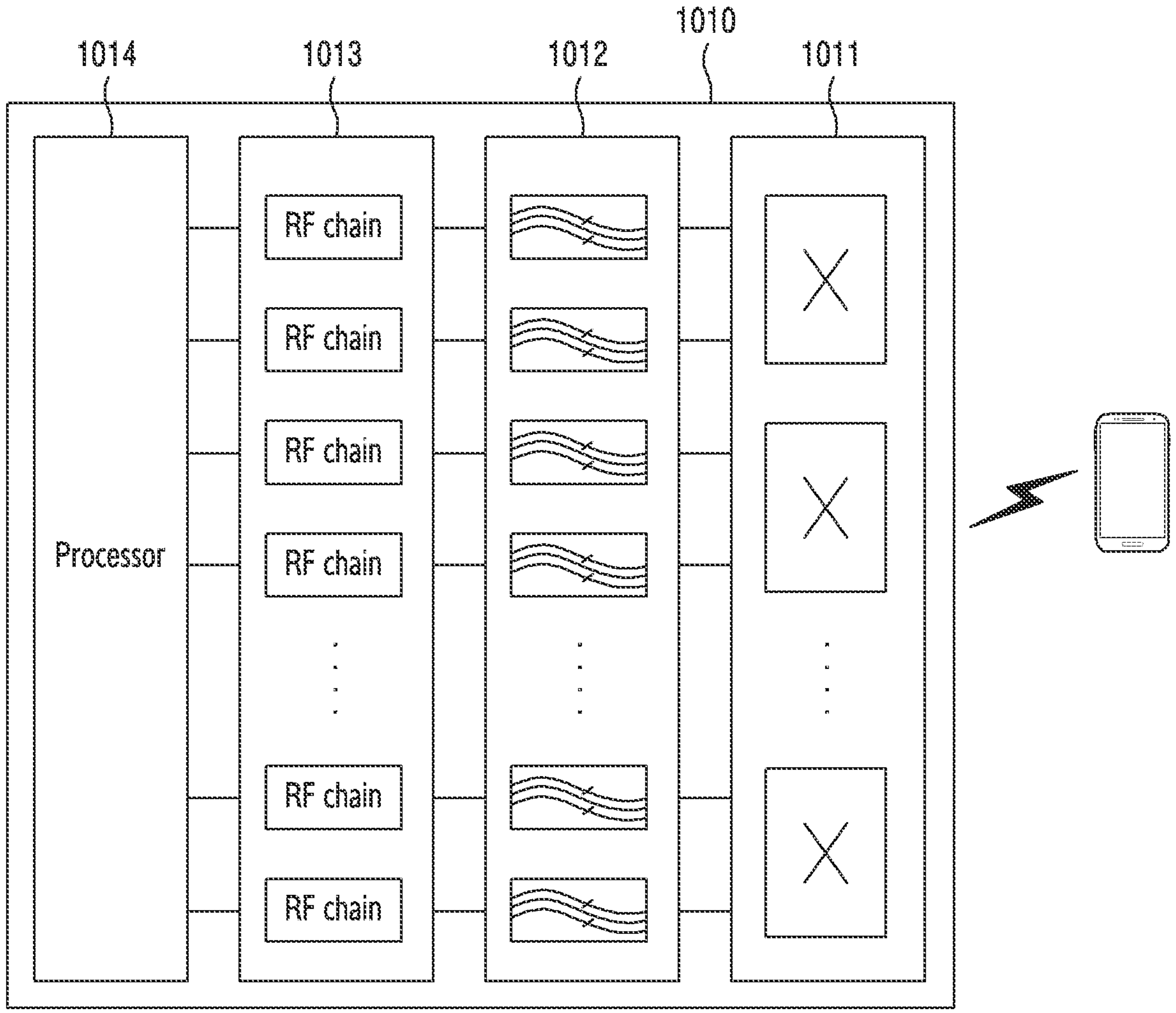
FIG. 10 shows a functional configuration of an electronic device according to an embodiment of the disclosure.

FIG. 10 shows a functional configuration of an electronic device according to an embodiment of the disclosure.

Referring to FIG. 10, a functional configuration of an electronic device 1010 is shown. An electronic device 1010 may include an antenna unit 1011, a filter unit 1012, a radio frequency (RF) processing unit 1013, and a controller 1014.

The antenna unit 1011 may include a plurality of antennas. The antenna performs functions for transmitting and receiving signals via a wireless channel. The antenna may include a radiator formed on a substrate (e.g., a PCB) as a conductor or a conductive pattern. The antenna may radiate an up-converted signal on a wireless channel or acquire a signal radiated by another device. Each antenna may be referred to as a radiator, an antenna element, or an antenna device. In some embodiments, the antenna unit 1011 may include an antenna array (e.g., a sub-array) in which a plurality of antenna elements form an array. The antenna unit 1011 may be electrically connected to the filter unit 1012 via RF signal lines. The antenna unit 1011 may be mounted on a PCB including a plurality of antenna elements. The PCB may include a plurality of RF signal lines connecting each antenna element and the filter of the filter unit 1012. These RF signal lines may be referred to as a feeding network. The antenna unit 1011 may provide the received signal to the filter unit 1012 or may radiate the signal provided from the filter unit 1012 into the air. An antenna having a structure according to an embodiment of the disclosure may be included in the antenna unit 1011.

The antenna unit 1011 according to various embodiments may include at least one antenna module having a dual polarization antenna. The dual polarization antenna may transmit and receive signals having different polarizations. For example, the dual polarization antenna transmits and receives a first signal having a polarization of +45° and a second signal having a polarization of −45°. Of course, the polarization may be formed by other orthogonal polarizations other than +45° and −45°. Each antenna element may be connected to a feeding line or indirectly connected by coupling, and may be electrically connected to the filter unit 1012, the RF processing unit 1013, and the controller 1014 described later.

According to another embodiment, the dual polarization antenna may be a patch antenna (or a microstrip antenna). By having the form of a patch antenna, the dual polarization antenna may be easily implemented and integrated into an array antenna. Two signals having different polarizations from each other may be input to antenna ports, respectively. Each antenna port corresponds to an antenna element. For high efficiency, optimizing the relationship between co-polarization characteristics and cross-polarization characteristics is required between two signals having different polarizations. In a dual polarization antenna, the co-pole characteristics indicate characteristics for a specific polarization component and the cross-pole characteristics indicate characteristics for a polarization component different from the specific polarization component.

An antenna (e.g., an antenna element, a sub-array, an antenna array) of an antenna apparatus including a separable PCB according to yet another embodiment of the disclosure may be included in the antenna unit 1011. For example, a first radiator or second radiators (e.g., a first metal patch and second metal patches) of an air coupling sub-array structure according to yet another embodiment of the disclosure is included in the antenna unit 1011 of FIG. 10.

The filter unit 1012 may perform filtering to transmit a signal of a desired frequency. The filter unit 1012 may perform a function for selectively identifying a frequency by forming a resonance. In some embodiments, the filter unit 1012 may form resonance via a cavity which structurally includes a dielectric. In addition, in some embodiments, the filter unit 1012 may form resonance via devices forming inductance or capacitance. In addition, in some embodiments, the filter unit 1012 may include an elastic filter such as a bulk acoustic wave (BAW) filter or a surface acoustic wave (SAW) filter. The filter unit 1012 may include at least one among a band pass filter, a low pass filter, a high pass filter, or a band reject filter. That is, the filter unit 1012 may include RF circuits for obtaining signals of a frequency band for transmission or a frequency band for reception. The filter unit 1012 according to various embodiments may electrically connect the antenna unit 1011 and the RF processing unit 1013 to each other.

The RF processing unit 1013 may include a plurality of RF paths. The RF path may be a unit of a path via which a signal received via an antenna or a signal radiated via an antenna passes. At least one RF path may be referred to as an RF chain. The RF chain may include a plurality of RF devices. The RF devices may include amplifiers, mixers, oscillators, DACs, ADCs, etc. For example, the RF processing unit 1013 includes an up-converter for up-converting a base band digital transmission signal to a transmission frequency, and a digital-to-analog converter (DAC) for converting the up-converted digital transmission signal into an analog RF transmission signal. The up-converter and the DAC form a part of a transmission path. The transmission path may further include a power amplifier (PA) or a coupler (or a combiner). In addition, for example, the RF processing unit 1013 includes an analog-to-digital converter (ADC) for converting an analog RF reception signal into a digital reception signal and a down-converter for converting a digital reception signal into a baseband digital reception signal. The ADC and the down-converter form a part of a reception path. The reception path may further include a low-noise amplifier (LNA) or a coupler (or a divider). RF parts of the RF processing unit may be implemented on a PCB. Antennas and RF parts of the RF processing unit may be implemented on PCBs, and filters may be repeatedly fastened between the PCBs to form a plurality of layers.

A radio frequency integrated circuit (RFIC) and a package board (PKG) of an electronic device including an air coupling sub-array structure according to yet another embodiment of the disclosure may be included in the RF processing unit 1013 of FIG. 10. That is, the RF processing unit 1013 may be an RF device for mmWave, and may include a radio frequency integrated circuit (RFIC). As described in the disclosure above, an RFIC may be formed as an RFIC chip coupled to a package board to be coupled to an RU board, or may be directly coupled to the RU board.

The controller 1014 may control overall operations of the electronic device 1010. The controller 1014 may include various modules for performing communication. The controller 1014 may include at least one processor such as a modem. The controller 1014 may include modules for digital signal processing. For example, the controller 1014 includes a modem. At the time of data transmission, the controller 1014 generates complex symbols by encoding and modulating a transmission bit stream. In addition, for example, at the time of data reception, the controller 1014 restores the received bit stream by demodulating and decoding a baseband signal. The controller 1014 may perform protocol stack functions required by communication standards.

FIG. 10 has described the functional configuration of an electronic device as a device to which devices according to various embodiments of the disclosure may be applied.

However, the example shown in FIG. 10 is a configuration of a device for a structure according to various embodiments of the disclosure described via FIGS. 4, 5B, 6 to 8, 9A, 9B, and 10, the embodiments of the disclosure are not limited to the elements of the apparatuses shown in FIG. 10. Therefore, an air coupling sub-array structure itself and an electronic device including the structure may also be understood as embodiments of the disclosure.

Referring to FIG. 10, in an antenna structure of a wireless communication system according to an embodiment of the disclosure as shown above, a first radiator, a first printed circuit board (PCB) on which the first radiator is disposed, a plurality of second radiators, a second PCB on which the plurality of second radiators are arranged, and a frame structure may be included, wherein the frame structure is disposed to form an air layer between the first PCB and the second PCB, and the plurality of second radiators may include a first metal patch disposed in an area corresponding to the first radiator and a plurality of second metal patches arranged while being spaced apart from the first metal patch to be fed by coupling.

In another embodiment, the first metal patch may be fed by coupling, from the first radiator, via a first point and a second point of the first metal patch, a first polarization may be formed in a first signal fed via the first point, and a second polarization may be formed in a second signal fed via the second point.

In yet another embodiment, the first metal patch may coupling-feed a co-polarization (co-pol) component of the first polarization of the first signal to metal patches arranged in a first arrangement among the plurality of second metal patches, and may coupling-feed a co-pol component of the second polarization of the second signal to metal patches arranged in a second arrangement among the plurality of second metal patches.

In yet another embodiment, the antenna structure may further include a third radiator and a third metal patch and a plurality of fourth metal patches included in the plurality of second radiators, wherein the third metal patch is disposed in an area corresponding to the third radiator, while being spaced apart therefrom, the plurality of fourth metal patches are arranged while being spaced apart from the third metal patch to be fed by coupling therefrom, the third metal patch is fed by coupling, from the third radiator, via a third point and a fourth point of the third metal patch, the first polarization is formed in the first signal fed via the third point, and the second polarization is formed in the second signal fed via the fourth point.

In yet another embodiment, the third metal patch may coupling-feed a co-polarization (co-pol) component of the first polarization of the first signal to metal patches arranged in a first arrangement among the plurality of fourth metal patches, and may coupling-feed a co-pol component of the second polarization of the second signal to metal patches arranged in a second arrangement among the plurality of fourth metal patches, and the plurality of fourth metal patches may at least partially overlap the plurality of second metal patches.

In yet another embodiment, the distance from the center of the first metal patch to the center of the third metal patch may be determined based on wavelengths of the first signal and the second signal fed to the first metal patch.

In yet another embodiment, the co-pol component of the first polarization may be formed to be orthogonal to the co-pol component of the second polarization.

In yet another embodiment, the co-pol component of the first polarization may be formed as +45°, and the co-pol component of the second polarization may be formed as −45°.

In yet another embodiment, the direction of the first arrangement may be orthogonal to the direction of the second arrangement.

In yet another embodiment, the first radiator and the plurality of second radiators may include at least one shape among a circle, a quadrangle, or an octagon.

According to yet another embodiment of the disclosure, as described above, an electronic device in a wireless communication system may include a plurality of sub-arrays and a plurality of RFICs connected to correspond to the plurality of sub-arrays, respectively, wherein the plurality of sub-arrays include a plurality of first radiators, a first printed circuit board (PCB) on which the plurality of first radiators are arranged, a plurality of second radiators, a second PCB on which the plurality of second radiators are arranged, and a frame structure, the frame structure is disposed to form an air layer between the first PCB and the second PCB, and the plurality of second radiators include a plurality of first metal patches arranged in an area corresponding to the plurality of first radiators, respectively, and a plurality of second metal patches arranged while being spaced apart from the plurality of first metal patches, respectively, to be fed by coupling.

In yet another embodiment, the plurality of first metal patches may be fed by coupling via a first point and a second point from the plurality of first radiators corresponding thereto, respectively, a first polarization may be formed in a first signal fed via the first point, and a second polarization may be formed in a second signal fed via the second point.

In yet another embodiment, the plurality of first metal patches may coupling-feed a co-polarization (co-pol) component of the first polarization of the first signal to the plurality of second metal patches arranged in a first arrangement based on the plurality of first metal patches, respectively, and may coupling-feed a co-pol component of the second polarization of the second signal to the plurality of second metal patches arranged in a second arrangement based on the plurality of first metal patches, respectively, and the first arrangement and the second arrangement may be orthogonal to each other.

In yet another embodiment, the co-pol component of the first polarization may be formed to be orthogonal to the co-pol component of the second polarization.

In an embodiment, the co-pol component of the first polarization may be formed as +45°, and the co-pol component of the second polarization may be formed as −45°.

In yet another embodiment, the plurality of sub-arrays may include a first sub-array and a second sub-array, and the distance between a plurality of first metal patches of the first sub-array and a plurality of first metal patches of the second sub-array may be determined based on the length of the wavelength of a signal supplied from the RFIC to the plurality of sub-arrays.

In yet another embodiment, the distance between a plurality of first metal patches of the first sub-array may be determined based on the length of the wavelength of the signal.

In yet another embodiment, the plurality of first radiators and the plurality of second radiators may include at least one shape among a circle, a quadrangle, or an octagon.

In yet another antenna structure of a wireless communication system according to an embodiment of the disclosure as described above, a first printed circuit board (PCB) including a feeding line, a first radiator, a plurality of second radiators, a second PCB, and a frame structure may be included, wherein the frame structure is disposed to form an air layer between the first PCB and the second PCB, the first radiator is disposed on a first surface of the second PCB, the plurality of second radiators are arranged on a second surface opposite to the first surface, the first radiator is fed by coupling from the feeding line of the first PCB, and the plurality of second radiators include a first metal patch disposed in an area corresponding the first radiator and a plurality of second metal patches arranged while being spaced apart from the first metal patch to be fed by coupling.

In yet another embodiment, the first metal patch may be fed by coupling, from the first radiator, via a first point and a second point of the first metal patch, a first polarization may be formed in a first signal fed via the first point, a second polarization may be formed in a second signal fed via the second point, the first metal patch may coupling-feed a co-polarization (co-pol) component of the first polarization of the first signal to the plurality of second metal patches arranged in a first arrangement based on the first metal patch, and may coupling-feed a co-pol component of the second polarization of the second signal to the plurality of second metal patches arranged in a second arrangement based on the first metal patch, and the first arrangement and the second arrangement may be orthogonal to each other.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna structure of a wireless communication system, the antenna structure comprising:

a first radiator;

a first printed circuit board (PCB) on which the first radiator is disposed;

a plurality of second radiators;

a second PCB on which the plurality of second radiators are arranged; and a frame structure, wherein the frame structure is disposed to form an air layer between the first PCB and the second PCB, and wherein the plurality of second radiators comprise:

a first metal patch disposed in an area corresponding to the first radiator, and a plurality of second metal patches, each arranged to be spaced apart from the first metal patch and to be fed by coupling from the first metal patch.

2. The antenna structure of claim 1, wherein the first metal patch is fed by coupling, from the first radiator, via a first point and a second point of the first metal patch, wherein a first polarization is formed in a first signal fed via the first point, and wherein a second polarization is formed in a second signal fed via the second point.

3. The antenna structure of claim 2, wherein the first metal patch is configured to:

coupling-feed a co-polarization (co-pol) component of the first polarization of the first signal to metal patches arranged in a first arrangement among the plurality of second metal patches; and coupling-feed a co-pol component of the second polarization of the second signal to metal patches arranged in a second arrangement among the plurality of second metal patches.

4. The antenna structure of claim 3, further comprising:

a third radiator;

a third metal patch; and a plurality of fourth metal patches included in the plurality of second radiators, wherein the third metal patch is disposed in an area corresponding to the third radiator, while being spaced apart therefrom, wherein the plurality of fourth metal patches are arranged while being spaced apart from the third metal patch to be fed by coupling therefrom, wherein the third metal patch is fed by coupling, from the third radiator, via a third point and a fourth point of the third metal patch, wherein the first polarization is formed in the first signal fed via the third point, and wherein the second polarization is formed in the second signal fed via the fourth point.

5. The antenna structure of claim 4, wherein the third metal patch is configured to:

coupling-feed a co-polarization (co-pol) component of the first polarization of the first signal to metal patches arranged in a first arrangement among the plurality of fourth metal patches; and coupling-feed a co-pol component of the second polarization of the second signal to metal patches arranged in a second arrangement among the plurality of fourth metal patches, and wherein the plurality of fourth metal patches at least partially overlap the plurality of second metal patches.

6. The antenna structure of claim 4, wherein a distance from the center of the first metal patch to the center of the third metal patch is determined based on wavelengths of the first signal and the second signal fed to the first metal patch.

7. The antenna structure of claim 3, wherein the co-pol component of the first polarization is formed to be orthogonal to the co-pol component of the second polarization.

8. The antenna structure of claim 7, wherein the co-pol component of the first polarization is formed as +45°, and the co-pol component of the second polarization is formed as −45°.

9. The antenna structure of claim 3, wherein a direction of the first arrangement is orthogonal to a direction of the second arrangement.

10. The antenna structure of claim 1, wherein the first radiator and the plurality of second radiators comprise at least one shape among a circle, a quadrangle, or an octagon.

11. An electronic device in a wireless communication system, the electronic device comprising:

a plurality of sub-arrays; and a plurality of radio frequency integrated circuits (RFICs) connected to correspond to the plurality of sub-arrays, respectively, wherein each of the plurality of sub-arrays comprises:

a plurality of first radiators, a first printed circuit board (PCB) on which the plurality of first radiators are arranged, a plurality of second radiators, a second PCB on which the plurality of second radiators are arranged, and a frame structure, wherein the frame structure is disposed to form an air layer between the first PCB and the second PCB, and wherein the plurality of second radiators comprise:

a plurality of first metal patches arranged in an area corresponding to the plurality of first radiators, respectively, and a plurality of second metal patches arranged while being spaced apart from the plurality of first metal patches, respectively, to be fed by coupling.

12. The electronic device of claim 11, wherein the plurality of first metal patches are fed by coupling via a first point and a second point from the plurality of first radiators corresponding thereto, respectively, wherein a first polarization is formed in a first signal fed via the first point, and wherein a second polarization is formed in a second signal fed via the second point.

13. The electronic device of claim 12, wherein the plurality of first metal patches are configured to:

coupling-feed a co-polarization (co-pol) component of the first polarization of the first signal to the plurality of second metal patches arranged in a first arrangement based on the plurality of first metal patches, respectively; and coupling-feed a co-pol component of the second polarization of the second signal to the plurality of second metal patches arranged in a second arrangement based on the plurality of first metal patches, respectively, and wherein the first arrangement and the second arrangement are orthogonal to each other.

14. An antenna structure of a wireless communication system, the antenna structure comprising:

a first printed circuit board (PCB) comprising a feeding line;

a first radiator;

a plurality of second radiators;

a second PCB; and a frame structure, wherein the frame structure is disposed to form an air layer between the first PCB and the second PCB, wherein the first radiator is disposed on a first surface of the second PCB, wherein the plurality of second radiators are arranged on a second surface opposite to the first surface, wherein the first radiator is fed by coupling from the feeding line of the first PCB, and wherein the plurality of second radiators comprise:

a first metal patch disposed in an area corresponding the first radiator, and a plurality of second metal patches arranged while being spaced apart from the first metal patch to be fed by coupling.

15. The antenna structure of claim 14, wherein the first metal patch is fed by coupling, from the first radiator, via a first point and a second point of the first metal patch, wherein a first polarization is formed in a first signal fed via the first point, wherein a second polarization is formed in a second signal fed via the second point, wherein the first metal patch is configured to:

coupling-feed a co-polarization (co-pol) component of the first polarization of the first signal to the plurality of second metal patches arranged in a first arrangement based on the first metal patch, and coupling-feed a co-pol component of the second polarization of the second signal to the plurality of second metal patches arranged in a second arrangement based on the first metal patch, and wherein the first arrangement and the second arrangement are orthogonal to each other.

16. The antenna structure of claim 15, wherein the first metal patch is fed via an M port and a P port, respectively.

17. The antenna structure of claim 16, wherein the M port and the P port are fed in consideration of polarization.

18. The antenna structure of claim 17, wherein the first signal having a polarization of −45° is fed to the M port and the first signal having a polarization of +45° is fed to the P port.

* * * * *